（12）United States Patent
Brodsky et al.

(10) Patent No.: US 12,072,453 B2
(45) Date of Patent: Aug. 27, 2024

(54) SYSTEM AND METHOD FOR NEUTRON AND GAMMA RADIATION DETECTION USING NON-HOMOGENEOUS MATERIAL SCINTILLATOR

(71) Applicant: Lawrence Livermore National Security, LLC, Livermore, CA (US)

(72) Inventors: Jason Philip Brodsky, Livermore, CA (US); Nathaniel Sean Bowden, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 6 days.

(21) Appl. No.: 17/845,322

(22) Filed: Jun. 21, 2022

(65) Prior Publication Data

US 2022/0326399 A1 Oct. 13, 2022

Related U.S. Application Data

(62) Division of application No. 17/065,103, filed on Oct. 7, 2020, now Pat. No. 11,402,516.

(Continued)

(51) Int. Cl.
  *G01T 1/20* (2006.01)
  *G01T 1/203* (2006.01)
  *G01T 3/06* (2006.01)

(52) U.S. Cl.
  CPC .......... *G01T 1/2006* (2013.01); *G01T 1/2002* (2013.01); *G01T 1/201* (2013.01); *G01T 1/2033* (2013.01); *G01T 3/06* (2013.01)

(58) Field of Classification Search
  CPC ...... G01T 1/2006; G01T 1/2002; G01T 1/201
  See application file for complete search history.

(56) References Cited

U.S. PATENT DOCUMENTS 5,258,478 A 11/1993 Schlenoff et al.
6,313,465 B1 * 11/2001 Nittoh ...................... G01T 7/00
250/370.11

(Continued)

FOREIGN PATENT DOCUMENTS

EP 2941657 B1 9/2016
JP 2001228253 A 8/2001

OTHER PUBLICATIONS

Y. Mishnayot, M. Layani, I. Cooperstein, S. Magdassi, and G. Ron, "Three-dimensional printing of scintillating materials," *Rev. Sci. Instrum.*, vol. 85, No. 8, p. 085102, Aug. 2014.

(Continued)

*Primary Examiner* — Hugh Maupin
(74) *Attorney, Agent, or Firm* — HARNESS, DICKEY & PIERCE, P.L.C.

(57) ABSTRACT

The present disclosure relates to a method for detecting incoming radiation having a plurality of differing properties including at least one of differing types, differing energies or differing incoming directions. The method involves using a scintillator structure formed from first and second dissimilar scintillator materials, where the first and second dissimilar scintillator materials emit first and second different colors of light in response to the incoming radiation. A first light detector is used for detecting light having the first color, and a second light detector is used for detecting light having the second color. A first output signal is generated in response to the detection of light having the first color, and a second output signal is generated in response to detecting light having the second color. The first and second output signals are then analyzed to determine at least one property of the incoming radiation.

20 Claims, 10 Drawing Sheets

Related U.S. Application Data

(60) Provisional application No. 62/912,350, filed on Oct. 8, 2019.

(56) References Cited

U.S. PATENT DOCUMENTS

| | | | | |
|---|---|---|---|---|
| 6,392,248 | B1* | 5/2002 | Takahara | G21K 4/00 250/580 |
| 10,266,759 | B1* | 4/2019 | Shah | C09K 11/7705 |
| 2006/0054863 | A1* | 3/2006 | Dai | G21K 4/00 252/301.4 R |
| 2007/0029493 | A1* | 2/2007 | Kniss | G01T 1/2008 250/370.11 |
| 2007/0085010 | A1* | 4/2007 | Letant | G01T 1/20 250/361 R |
| 2008/0311380 | A1* | 12/2008 | Agrawal | C08G 59/30 428/688 |
| 2009/0032717 | A1 | 2/2009 | Aykac et al. | |
| 2009/0121141 | A1 | 5/2009 | Eriksson et al. | |
| 2009/0166549 | A1 | 7/2009 | Czirr | |
| 2009/0202043 | A1 | 8/2009 | Cantu et al. | |
| 2011/0291014 | A1 | 12/2011 | Kusner | |
| 2012/0145963 | A1 | 6/2012 | Andreaco et al. | |
| 2012/0161013 | A1* | 6/2012 | Huston | G01T 1/20 250/361 R |
| 2012/0321042 | A1 | 12/2012 | Watanabe et al. | |
| 2013/0299702 | A1* | 11/2013 | Zaitseva | G21K 4/00 250/361 R |
| 2015/0346362 | A1* | 12/2015 | Kondrasovs | G01T 1/2008 250/367 |
| 2016/0154122 | A1* | 6/2016 | Noh | G01T 1/2033 250/362 |
| 2016/0266263 | A1* | 9/2016 | Vacheret | G01T 3/06 |
| 2017/0145307 | A1 | 5/2017 | Mintzer et al. | |
| 2018/0172846 | A1* | 6/2018 | Lam | G01T 1/20185 |
| 2019/0170887 | A1 | 6/2019 | Huber et al. | |
| 2019/0257957 | A1* | 8/2019 | Shinji | G02B 6/02 |
| 2020/0301028 | A1* | 9/2020 | Tyagi | C30B 29/12 |
| 2020/0400857 | A1 | 12/2020 | Newman | |
| 2020/0407626 | A1* | 12/2020 | Hamel | G01T 1/2018 |

OTHER PUBLICATIONS

M. Durrance, N. Merino, N. Sultan, R. France, and S. Carceccia, "3D Printing Plastic Scintillators," in *Bulletin of the American Physical Society*, vol. 62, No. 13.

N. J. Cherepy et al. "Bismuth-Loaded Plastic Scintillator Portal Monitors". In: Hard X-Ray, Gamma-Ray, and Neutron Detector Physics XX. Hard X-Ray, Gamma-Ray, and Neutron Detector Physics XX. vol. 10762. International Society for Optics and Photonics, Sep. 13, 2018, 107620B. URL: https://www.spiedigitallibrary.org/conference-proceedings-of-spie/10762/107620B/Bismuth-loaded-plastic-scintillator-portal-monitors/10.1117/12.2320884.short.

X. Zheng et al. "Design and Optimization of a Light-Emitting Diode Projection Micro-Stereolithography Three-Dimensional Manufacturing System". Review of Scientific Instru-ments 83.12 (Dec. 1, 2012), p. 125001. URL: https://aip.scitation.Org/doi/full/10.1063/1.4769050.

S. Lee et al. "Characterization of Plastic Scintillator Fabricated by UV LED Curing Ma-chine". Nuclear Instruments and Methods in Physics Research Section A: Accelerators, Spec-trometers, Detectors and Associated Equipment 929 (Jun. 11, 2019), pp. 23-28. URL: http://www.sciencedirect.com/science/article/pii/S0168900219303614.

J. S. Beaumont et al. "A Fast-Neutron Coincidence Collar Using Liquid Scintillators for Fresh Fuel Verification". Journal of Radioanalytical and Nuclear Chemistry 314.2 (Nov. 1, 2017), pp. 803-812. URL: https://doi.org/10.1007/sl0967-017-5412-x.

Taking Advantage of Disorder: Small-Molecule Organic Glasses for Radiation Detection and Particle Discrimination | Journal of the American Chemical Society. URL: https://pubs.acs.org/doi/abs/10.1021/jacs.7b03989.

N. S. Bowden et al. "Directional Fast Neutron Detection Using a Time Projection Chamber". Nuclear Instruments and Methods in Physics Research Section A: Accelerators, Spectrometers, Detectors and Associated Equipment 624.1 (Dec. 1, 2010), pp. 153-161. URL: http://www.sciencedirect.com/science/article/pii/S0168900210019728.

J. Brennan et al. "Measurement of the Fast Neutron Energy Spectrum of an 241Am-Be Source Using a Neutron Scatter Camera". IEEE Transactions on Nuclear Science 58.5 (Oct. 2011), pp. 2426-2430. DOI: 10.1109/TNS.2011.2163192.

K. Weinfurther et al. "Model-Based Design Evaluation of a Compact, High-Efficiency Neutron Scatter Camera". Nuclear Instruments and Methods in Physics Research Section A: Accelerators, Spectrometers, Detectors and Associated Equipment 883 (Mar. 1, 2018), pp. 115-135. URL: http://www.sciencedirect.com/science/article/pii/S0168900217312238.

J. Braverman et al. "Single-Volume Neutron Scatter Camera for High-Efficiency Neutron Imaging and Spectroscopy" (Feb. 14, 2018). arXiv: 1802.05261 [physics]. URL: http://arxiv.org/abs/1802.05261.

K. Shimazoe et al. "Color Sensitive Silicon Photomultipliers with Micro-Cell Level Encoding for DOI PET Detectors". Nuclear Instruments and Methods in Physics Research Section A: Accelerators, Spectrometers, Detectors and Associated Equipment. Imaging 2016 873 (Nov. 21, 2017), pp. 12-15. URL: http://www.sciencedirect.com/science/article/pii/S0168900217302061.

V. V. Nagarkar et al. "Continuous Phoswich™ Detector for Molecular Imaging". In: IEEE Nuclear Science Symposuim Medical Imaging Conference. IEEE Nuclear Science Symposuim Medical Imaging Conference. Oct. 2010, pp. 4-9. DOI: 10.1109/NSSMIC.2010.5873707.

E. Yoshida et al. "Four-Layered DOI-PET Detector with Quadrisected Top Layer Crystals". Nuclear Instruments and Methods in Physics Research Section A: Accelerators, Spectrometers, De-tectors and Associated Equipment 933 (Jul. 21, 2019), pp. 1-7. URL: http://www.sciencedirect.com/science/article/pii/S0168900219304723.

A. N. Mabe et al. "Transparent Plastic Scintillators for Neutron Detection Based on Lithium Salicylate". Nuclear Instruments and Methods in Physics Research Section A: Accelerators, Spectrometers, Detectors and Associated Equipment 806 (Jan. 11, 2016), pp. 80-86. URL: http://www.sciencedirect.com/science/article/pii/S0168900215012000.

P. Collaboration et al. "Measurement of the Antineutrino Spectrum from ${235}$U Fission at HFIR with PROSPECT" (Dec. 27, 2018). arXiv: 1812.10877 [hep-ex, physics :nucl-ex, physics: physics]. URL: http://arxiv.org/abs/1812.10877.

A. Cabrera et al. "Neutrino Physics with an Opaque Detector" (Aug. 7, 2019). arXiv: 1908.02859 [hep-ex, physics:physics]. URL: http://arxiv.org/abs/1908.02859.

V. A. Li et al. "A Prototype for SANDD: A Highly-Segmented Pulse-Shape-Sensitive Plastic Scintillator Detector Incorporating Silicon Photomultiplier Arrays". Nuclear Instruments and Methods in Physics Research Section A: Accelerators, Spectrometers, Detectors and Associated Equipment 942 (Oct. 21, 2019), p. 162334. URL: http://www.sciencedirect.com/science/article/pii/S0168900219309209.

J. M. Ryan et al. "A Scintillating Plastic Fiber Tracking Detector for Neutron and Proton Imaging and Spectroscopy". Nuclear Instruments and Methods in Physics Research Section A: Accelerators, Spectrometers, Detectors and Associated Equipment 422.1 (Feb. 11, 1999), pp. 49-53. URL: http://www.sciencedirect.com/science/article/pii/S0168900298010614.

I. Mor et al. "Fast-Neutron Imaging Spectrometer Based on Liquid Scintillator Loaded Capillaries". Journal of Instrumentation 7.04 (Apr. 2012), pp. C04021-C04021. URL: https://doi.org/10.1088%2F1748-0221%2F7%2F04%2Fc04021.

P. Huber et al. "Chandler R&D Status". Journal of Physics: Conference Series 1216 (Apr. 2019), p. 012014. URL: https://doi.org/10.1088%2F1742-6596%2F1216%2FI%2F012014.

R. T. Kouzes, A. T. Lintereur, and E. R. Siciliano, "Progress in alternative neutron detection to address the helium-3 shortage," *Nucl. Instrum. Methods Phys. Res. Sect. Accel. Spectrometers Detect. Assoc. Equip.*, vol. 784, pp. 172-175, Jun. 2015.

(56) References Cited

OTHER PUBLICATIONS

G. A. Dosovitskiy et al., "First 3D-printed complex inorganic polycrystalline scintillator," *CrystEngComm*, vol. 19, No. 30, pp. 4260-4264, Jul. 2017.
K. Kazkaz, N. S. Bowden, and M. Pedretti, "Comparison of Lithium Gadolinium Borate Crystal Grains in Scintillating and Nonscintillating Plastic Matrices," *IEEE Trans. Nucl. Sci.*, vol. 60, No. 2, pp. 1416-1426, Apr. 2013.
J. Ashenfelter et al., "The PROSPECT physics program," *J. Phys. G Nucl. Part. Phys.*, vol. 43, No. 11, p. 113001, 2016.
L. Sun et al. "A Scintillating Plastic Fiber Array and Multiplexer Based 384-Channel Fast Neutron Spectrometer". Review of Scientific Instruments 88.12 (Dec. 1, 2017), p. 123303. URL: https://aip.scitation.org/doi/10.1063/1.4992003.
N. P. Zaitseva et al., "Recent developments in plastic scintillators with pulse shape discrimination," *Nucl. Instrum. Methods Phys. Res. Sect. Accel. Spectrometers Detect. Assoc. Equip.*, vol. 889, pp. 97-104, May 2018.
International Search Report and Written Opinion regarding International Application No. PCT/US2020/054812, dated Jan. 29, 2021.
International Search Report and Written Opinion in corresponding European Patent Application No. 20874052.2 dated Sep. 12, 2023, 13 pages.
Maj, A. et al. "The Paris Project," Acta Physica Polonica Series B 40(3), Sep. 1, 2008, pp. 1-12.
Extended European Search Report, European Patent Application No. 2087405.2 mailed Jan. 19, 2024, 17 pages.

\* cited by examiner

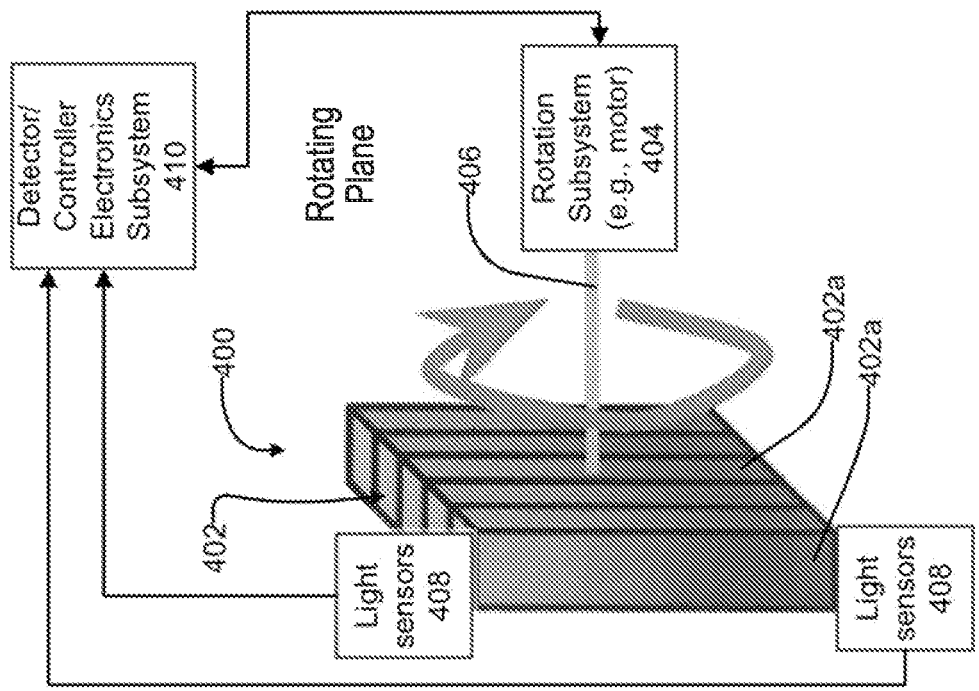
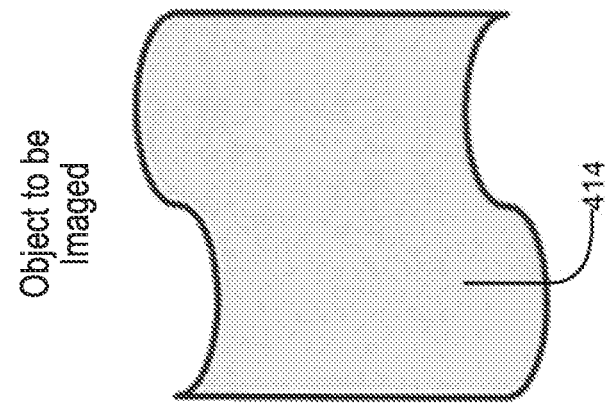
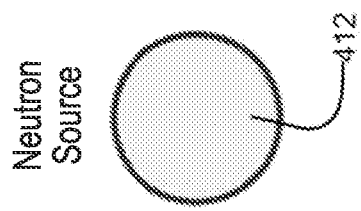
FIGURE 6

SYSTEM AND METHOD FOR NEUTRON AND GAMMA RADIATION DETECTION USING NON-HOMOGENEOUS MATERIAL SCINTILLATOR

CROSS-REFERENCE TO RELATED APPLICATIONS

This application is a divisional and claims the benefit and priority of U.S. patent application Ser. No. 17/065,103, filed Oct. 7, 2020, which claims the benefit of U.S. Provisional Application No. 62/912,350, filed on Oct. 8, 2019. The entire disclosure of the above application is incorporated herein by reference.

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to scintillator systems for different types of radiation, and more particular to a system that makes use of a scintillator structure having a non-homogeneous material structure that responds differently to different types of received radiation, thus enabling the detection of different types of radiation using a single scintillator structure.

BACKGROUND

The statements in this section merely provide background information related to the present disclosure and may not constitute prior art.

Scintillation detectors serve as the backbone of radiation detection. Although some of the most cost efficient and most expensive radiation detectors use different technologies, the majority of applied radiation detectors rely on scintillation to measure radiation energy at reasonable cost and robustness.

Basic scintillation detectors identify when radiation has deposited energy inside the scintillator and how much energy was deposited. These detectors allow users to detect the presence and spectrum of radiation. The spectrum can be used to identify the radiation source, including distinguishing threat from non-threat sources. However, this source identification is limited by the energy resolution of the detector, the presence of shielding around the source, radioactive backgrounds, and short measurement durations or long distances, which each reduce the statistical precision of the measurement. Advanced detectors augment this basic design by adding capabilities that detect more parameters about the radiation and its source.

To enhance DNN (U.S. Office of Defense Nuclear Nonproliferation) applications, more advanced detectors distinguish neutrons from gamma-rays, as neutrons are an indicator of SNM (special nuclear material) sources. One approach to this is pulse-shape discrimination (PSD), a technique in which the scintillating material is doped with fluors that produce a distinct pulse shape when hit with fast neutrons. Solid PSD plastic scintillators are a topic of active research and have seen significant improvements in their scale, light output, and discrimination ability in recent years. However, they still limited in scale to about 20 cm. Liquid PSD scintillators are more available, but liquid-based detectors are less robust and less portable than solid detectors. PSD detectors of either type also require expensive fast electronic instrumentation that further raises their cost.

Another approach to neutron identification involves doping the scintillating material with a substance such as gadolinium or lithium-6 that produces additional radiation when it captures a thermal neutron. This approach is similar to the now-standard helium-3 detectors, but doped scintillators have not yet exhibited neutron-gamma separation competitive with helium-3. Thus, users who require neutron radiation identification for SNM detection must choose between small and expensive solid PSD detectors, less robust and still expensive liquid PSD detectors, or neutron capture detectors with limited efficiency.

Other advanced scintillation detectors allow the user to identify the location of radiation interactions. These detectors typically require the use of multiple, separately-instrumented detector volumes. By observing which detector volume the radiation interacted in, the location of the interaction can be determined. Unfortunately, the ability to precisely locate interactions is limited by the size of a single scintillator volume: using smaller volumes enables more precise location-finding, but increases the total number of volumes, thereby increasing the cost of instrumenting each volume separately. The number of volumes and associated cost also rises if the detector is subdivided along more dimensions, making 3D position-finding particularly difficult and expensive.

Some detectors are able to locate an interaction within a single volume using a double-ended instrumentation. However, this capability requires costly fast electronics and only works in a single dimension. Thus, a detector that can precisely locate radiation interactions without using many separately-instrumented volumes-particularly if such a detector could do so along multiple dimensions and without fast electronics-will vastly improve both the accuracy and cost-benefit of detection activities.

In response to these limitations, optical lattices emerged as a tool for locating interactions in three dimensions within a scintillation detector, while reducing instrumentation requirements. This type of detector uses an arrangement of scintillating cubes separated from each other by thin gaps. Light produced in one cube will undergo total internal reflection at the interface between the plastic and the air that fills the gaps, and as a result that light will preferentially travel to cubes in the same X, Y and Z rows as the origin cube. The optical lattice can then identify which volume the interaction was in by instrumenting each row in three dimensions, and thus obviating the need to instrument each individual cube. For example, a 10×10×10 optical lattice would need 30 instruments instead of 1000. However, current optical lattices require careful hand assembly, which limits the scale of these detectors and significantly compounds the expense. This technological innovation could benefit from a practical and cost-effective technique to produce optical lattices with smaller cubes in greater numbers than has previously been achieved.

All the advanced capabilities described above have an additional tradeoff in common. The special materials and construction that enable their advanced capabilities interfere with optimal collection of the light produced in the scintillator, and so reduce the energy resolution of these detectors. The amount of light initially emitted is a property of the chemistry of the scintillating material, but the detector construction and design play a major role in determining how much of the light emitted is collected onto sensors instead of leaked or lost to absorption in the detector materials. The more light observed, the better the statistical precision of the measurement of the radiation energy. In general, optimizing the light collected, that is, the precision of the energy measurement, competes with integrating advanced scintillation-detection features. By easing this tradeoff, innovations that improve the ability to collect light indirectly enable other advanced capabilities.

These existing advanced scintillating materials owe their success to substantial effort to master the complex chemistry behind conventional methods of scintillator production. Whether producing a plastic, ceramic, or crystal scintillator, tight control of the chemistry is required to prevent spoilage of the material during its production. The challenge increases for larger pieces of scintillating material. For example, plastic scintillators are typically produced by bulk polymerization, which is an exothermic process. As the piece size grows larger, the shrinking surface area to volume ratio makes dissipating the heat of polymerization more difficult. As the process complexity grows with the piece size, production yields drop, making large pieces particularly expensive. Conventional methods such as casting or crystal growth also are limited in their ability to produce complex form factors directly, and so instead typically produce solid blocks that must be machined to the desired shape. The additional machining required represents an additional manufacturing operation which further adds to the production costs.

A recently developed alternative to these conventional methods is additive manufacturing (AM) of scintillating materials. Although additive manufacturing is used for a wide and ever-increasing number of applications, there has been only a small amount of research into the AM of scintillating materials. Mishyanot et al., "Three Dimensional Printing of Scintillating Materials," *Rev. Sci. Instrum*, Vol. 85, No. 8, p. 085102, August 2014 were the first to demonstrate the AM of a plastic scintillator in 2014. They used 3D printing of an acrylic monomer combined with a number of scintillator fluors including naphthalene—to produce a plastic scintillator with 30% of the light yield of a conventional reference scintillator. Although this result shows that the AM of plastic scintillators is not yet mature enough to perform on par with conventionally produced scintillators, Mishyanot et al. highlighted the potential of using AM in this field when they manufactured a functioning prototype scintillator with an unusual form factor that would be almost impossible to produce using conventional methods.

Since 2014, a few other researchers have shown promising-though early-results of AM scintillators. Durrance et al., "3D Printing Plastic Scintillators," *Bulletin of the American Physical Society*, Vol. 62, No. 13, 2017, showed success using PET as a plastic base with T-Glase as a fluor. Their work demonstrates that AM of plastic scintillator is likely to work with a number of different fluors, suggesting that AM scintillators will likely eventually be available with the wide variety of light-producing properties possible with a conventional scintillator. Dosovitsky et al., "First 3D-printed Complex Inorganic Polycrystalline Scintillator," *CrystEngComm*, Vol. 19, No. 33, July 2017, pp. 4260-4264, demonstrated the AM of a ceramic scintillator, which can have very different and often superior properties to a plastic scintillator. These early projects reveal a breadth of opportunities for AM within the scintillation-detector arenas.

SUMMARY

This section provides a general summary of the disclosure, and is not a comprehensive disclosure of its full scope or all of its features.

In one aspect the present disclosure relates to a method for detecting incoming radiation having a plurality of differing properties including at least one of differing types, differing energies or differing incoming directions. The method may comprise using a scintillator structure formed from first and second dissimilar scintillator materials, where the first and second dissimilar scintillator materials emit first and second different colors of light in response to the incoming radiation. The method further includes using a first light detector for detecting light having the first color, and using a second light detector for detecting light having the second color. The method further includes generating a first output signal in response to detecting light having the first color, and generating a second output signal in response to detecting light having the second color, and then analyzing the first and second output signals to determine at least one property of the incoming radiation.

In another aspect the present disclosure relates to a method for detecting incoming radiation having a plurality of differing properties including at least one of differing types, differing energies or differing incoming directions. The method may comprise using a scintillator assembly formed from elongated scintillator structures, wherein each elongated scintillator structure is formed from first and second dissimilar scintillator materials and is separated by an area forming a gradient mixture of the first and second materials, and where the first and second dissimilar scintillator materials emit first and second different colors of light in response to the incoming radiation. The method may further include using a plurality of first light detectors for detecting light having the first color, and using a plurality of second light detectors for detecting light having the second color. The method may further include generating a first output signal in response to detecting light having the first color, and generating a second output signal in response to detecting light having the second color. The method may further include analyzing the first and second output signals to determine at least one property of the incoming radiation.

In still another aspect the present disclosure relates to a method for detecting incoming radiation having a plurality of differing properties including at least one of differing types, differing energies or differing incoming directions. The method may comprise using a scintillator structure formed as a sphere from a first scintillator material at a core area of the sphere, a second scintillator material surrounding the core area, and a gradient mixture area of the first and second scintillator materials disposed between the first scintillator and second scintillator materials, to receive the incoming radiation. The sphere may be used to generate first and second different colors of light in response to the incoming radiation. The method further includes using a first light detector for detecting light having the first color, using a second light detector for detecting light having the second color. The method further includes generating a first output signal in response to detecting light having the first color, and generating a second output signal in response to detecting light having the second color. The method further include analyzing the first and second output signals to determine at least one property of the incoming radiation.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIG. 6 shows another embodiment of the present disclosure adapted for neutron radiograph, wherein the scintillator structure is rotated within a plane, which enables finely resolving the position of the neutron interaction in the axis of the PR gradient of the scintillator structure;

DETAILED DESCRIPTION

Example embodiments will now be described more fully with reference to the accompanying drawings.

The present disclosure involves embodiments of a scintillator, and in one specific embodiment a plastic scintillator, with non-homogenous physical structure to achieve desirable properties that are difficult, if not impossible, to achieve in a conventional plastic scintillator. For example, the present disclosure in one embodiment involves a plastic scintillator made of a lattice of two different materials that allows for discrimination between neutron and gamma radiation, as neutron-induced proton recoils produce short track lengths that will remain inside one material while gamma-induced electron recoils will encounter both materials. The present disclosure recognizes that his principle can be extended to several desirable properties beyond neutron/gamma discrimination, including facilitating fine position resolution and detection of pointing direction of a source.

The present disclosure takes advantage of the understanding that, while every scintillating material produces light when struck by radiation, the properties of that light vary from material to material. The conversion of energy from the radiation interaction into optical photons occurs with an efficiency that varies from material to material, resulting in different light intensities. The wavelength of the photons produced also depends on the material, as does the pulse duration of the light emission. Separate from the properties of light production, scintillating materials also vary in how light is transported through the material to the sensing instrumentation. The index of refraction of the scintillating material can vary, as can the photon scattering length.

The consequence of the various properties of scintillating materials is that observing the light in a scintillation detector reveals not only how much energy radiation deposited in the scintillator but also in which material those deposits occurred. In a detector constructed from multiple materials arranged in specific structures, knowing which materials were hit by the radiation tells the user how that radiation passed through the structures. With the right choice of structures, a mixed-material scintillator system can encode valuable information about the radiation, giving the MMSS advanced capabilities.

Figures 1, 1A:
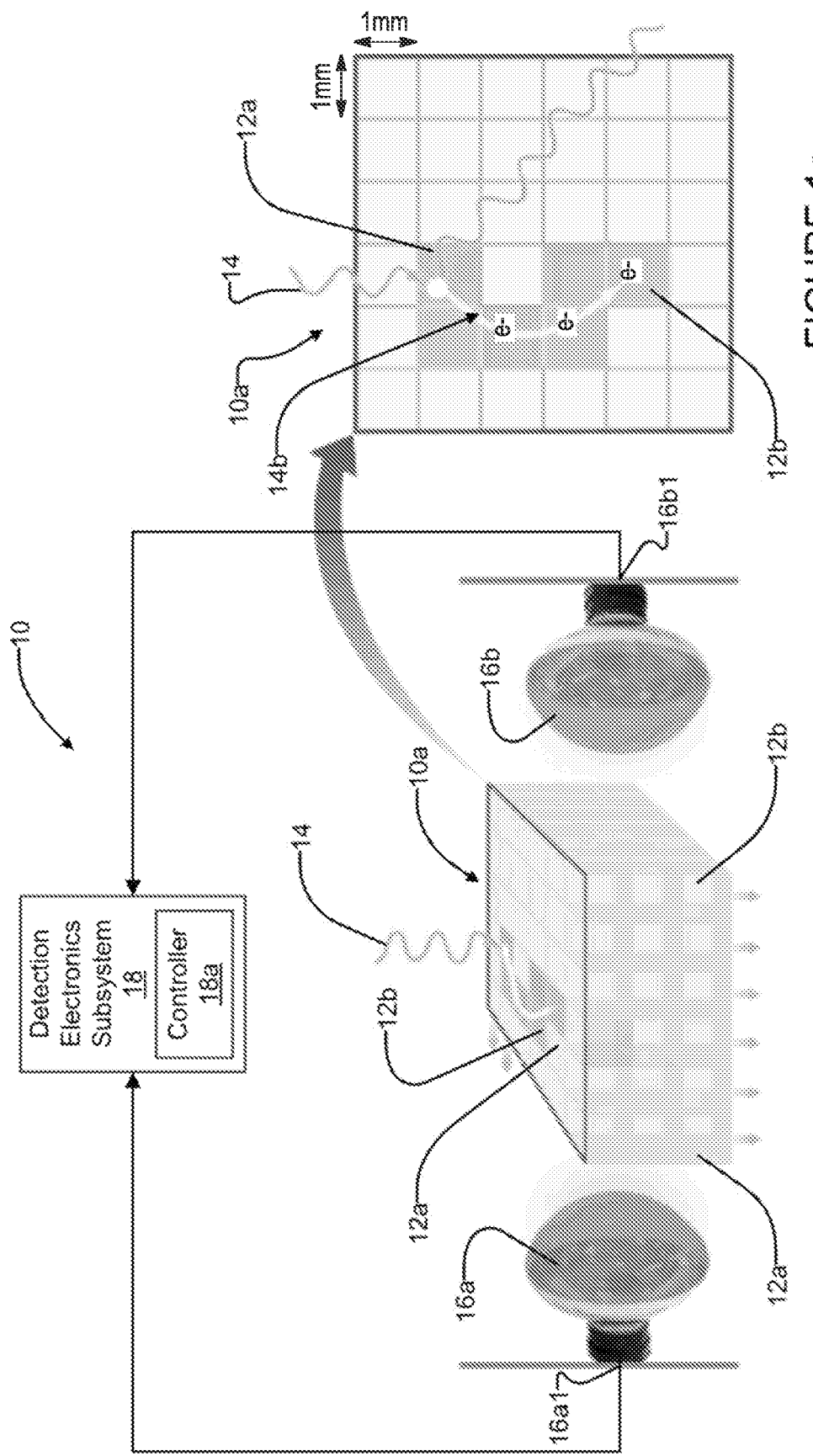
FIG. 1 is a high level perspective illustration of one embodiment of a scintillator system in accordance with the present disclosure.
FIG. 1a is a plan top view of the scintillator system of Figure illustrating how gamma radiation passes through and deposits energy in four of the cubes of the scintillator structure.

Referring to FIG. 1, a mixed material scintillator system 10 (hereinafter simply "MMSS" 10) is shown in accordance with one embodiment of the present disclosure. The system 10 in this example is comprised of a plurality of like-sized cubes 12 formed immediately adjacent one another, which each form scintillator elements, and which cooperatively form a scintillator structure 10a. The cubes 12, however, are made of two different scintillating materials, and thus represented in FIGS. 1 and 2 by reference numbers 12a and 12b to denote the cubes being of different materials. The dimensions of the cubes 12a and 12b may vary widely to meet the needs of a specific application, but in one example the cubes 12a and 12b may be 1 mm square cubes. Additionally, the configuration of the cubes 12a and 12b may vary, but in the embodiment shown in FIGS. 1 and 2 the cubes 12a and 12b are arranged in a uniform, alternating fashion. It is anticipated that for most applications, an overall rectangular or square shape for the scintillator structure 10a will be preferred, although virtually any shape may be constructed to meet the needs of a specific application.

Figure 2:
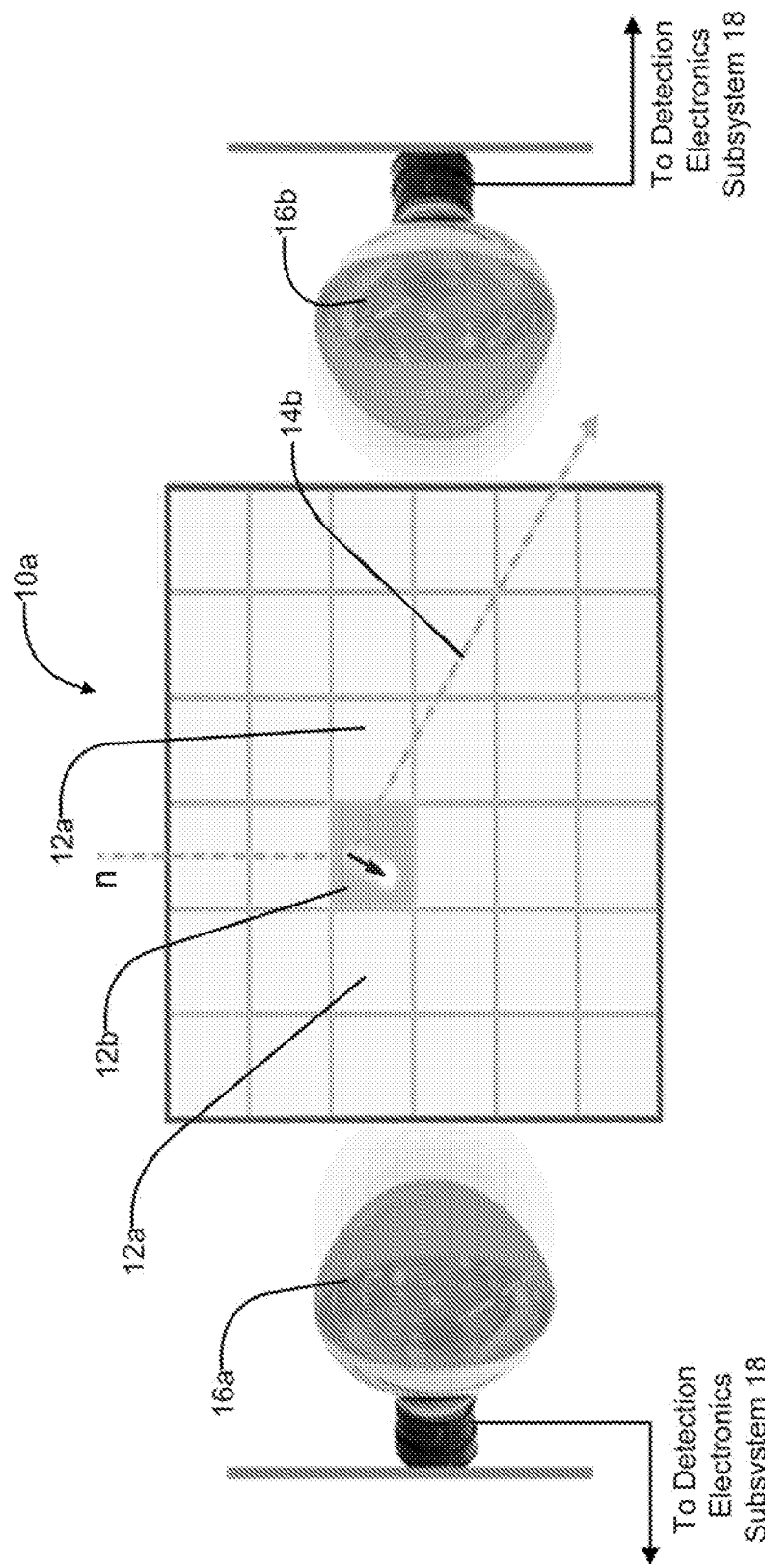
FIG. 2 is a plan top view of the scintillator structure of FIG. 1 but showing a path that a neutron may take when entering the scintillator structure, wherein its energy is deposited in only one cube of the scintillator structure.

In this embodiment each of the cubes 12a is comprised of a scintillating material which produces a first color of light in response to received radiation 14 passing therethrough, while the each of the cubes 12b produce a second (i.e., different) color of light in response to radiation passing therethrough. In one specific embodiment the cubes 12b may be comprised of a material that produces blue light and the cubes 12a may be comprised of a material that produces green light, although it will be appreciated that the invention is not limited to only using materials that produce these two colors, and that materials that produce other colors of light may potentially be used as well. The use of two dissimilar materials for the cubes 12a and 12b enables the scintillator structure 10a to provide output signals which distinguish between gamma and neutron radiation being received. This is because neutrons produce short ionizing tracks in the detector (20 microns from a 1 MeV neutron recoil), as indicated by track 14a in FIG. 2, and remain entirely in one cube 12a or 12b, as illustrated in FIG. 2. However, when a gamma hits one of the cubes 12a or 12b, it will produce a recoil electron that deposits energy over a track spanning several adjacent cubes 12a and 12b (e.g., 4 mm from a 1MeV gamma), as indicated in FIG. 1a by track 14b, and therefore produces a mixture of the two light colors. Thus, the particle type can be identified by determining if the scintillation signal 14 irradiating the scintillator structure 10a has produced light of only one color, indicating a neutron in a single cube 12a or 12b, or light having components of both colors, indicating a gamma's track hitting multiple cubes 12a and 12b.

This straightforward analysis on the signal produced by the scintillator structure 10a is made possible, and at low expense, by incorporating two light sensors 16a and 16b as part of the system 10. The light sensor 16a in this embodiment may be formed by a first light sensitive photomultiplier tube, which in one specific embodiment may be formed by a green light sensitive photomultiplier tube, while the light sensor 16b may be formed by a second light sensitive photomultiplier tube, which in one specific embodiment may be a blue light sensitive photomultiplier tube. It will also be appreciated that silicon photomultipliers (SiPMs) would work equally well as photomultiplier tubes (PMTs). Still other choices for some applications may be avalanche photodiodes, microchannel plates, and a variety of other sensors. In general, virtually all light sensors used for conventional scintillators are potentially useable as light sensors for one or more of the embodiments discussed herein, and the present disclosure is not limited to use with any one specific form of light detector.

The light sensors 16a and 16b generate electrical output signals at their outputs 16a1 and 16b1 which are input to a detection electronics subsystem 18. The detection electronics subsystem 18 may be an integral portion of the system 10 (e.g., housed in a housing which also includes the scintillator structure 10a) or it may be a fully independent subsystem which is coupled via suitable electrical connections to the light sensors 16a and 16b to receive the outputs 16a1 and 16b1. The detection electronics system 18 may optionally include a controller 18a, as well as suitable memory (e.g., RAM or ROM, not shown), as well as an optional display system (e.g., LCD, CRT, LED indicators, etc., not shown). The detection electronics subsystem 18 interprets the signals from the light sensors 16a and 16b to determine whether neutrons or gamma radiation is being received by the system 10 and provides information to a user to indicate which type of radiation, if any, has been detected by the scintillator structure 10a. Accordingly, a central function of the detection electronics subsystem 18 is to turn the received signal into a digital record in memory. This "digitization" can happen "fast" (recording the state of the signal every nanosecond, or even more frequently) or "slow" (recording the signal about every 100 nanoseconds or even less frequently).

In practice it is anticipated that the scintillator structure 10a will be constructed with hundreds or even thousands of the cubes 12a and 12b. The small dimensions of the cubes 12a and 12b (e.g., preferably around 1 mm in one embodiment), would be impractical to assemble using conventional casting, machining, and assembly. However, using an additive manufacturing system, this design could be produced in several ways to suit the specific materials chosen and the final design parameters. A 3D printer may be used to construct an open lattice of cubes of just one material, allowing the second material to be poured in in liquid form and then cured solid. Another option is to 3D print using a mixing nozzle that combines a base material with one of two types of fluors to produce cubes of either material. In another approach, the scintillating materials would be produced conventionally, chopped or powdered, and suspended in a clear ink that could be 3D printed at room temperature, which could allow a wider choice of materials including those not tolerant of higher temperatures. Pick-and-place assembly is a recent innovation in AM that also allows conventionally produced cubes to be assembled into the appropriate structure with close to zero chemical or physical disruption of the material. The wide array of possible routes for AM of this design allows the designer to optimize the design for a particular use case and be confident that one has remained within parameters that can feasibly be manufactured.

Particle Identifying (PID) MMSS

Additive manufacturing produced MMSS detectors, such as the system 10 in FIG. 1, yield the opportunity for creating specific particle-identifying ("PID") mixed material scintillator structures. As with the example of the system 10 in FIG. 1, a PID MMSS uses structures tailored to a given application. For example, the size of the cubes 12 may be increased or decreased; such a design change is made simple thanks to additive manufacturing, which can readily produce structures as fine as 10s of microns or even smaller with cutting-edge AM techniques. Similarly, instead of the cubes 12a and 12b being configured with alternating green and blue scintillating materials, the two scintillating materials might be fast and slow emitting materials. Still further, the two materials may be low light yielding and high light yielding materials. Still further, combinations of these different types of materials may even be incorporated in the scintillator structure 10a.

A PID MMSS, such as the system 10 of FIG. 1, is well suited for making a target measurement to detect a neutron rate and spectrum above a background environment. One specific application may be a shielded nuclear smuggling threat source which is present approximately 1 m from the system 10. As noted above, the scintillator structure 10a may be formed as a cubic PID checkerboard, with the cube size between 0.1 and 0.5 mm, in between the typical track length of a gamma and a neutron interaction. Materials for manufacturing the scintillator structure 10a may comprise, without limitation, Polyvinyltoulene (PVT) with a blue emitting dye, and PVT with the green-emitting dye 3-hydroxyflavone (SHF). A similar scintillating plastic (e.g., polystyrene) could be substituted for PVT. An enhancement may use a dopant to increase the emission time constant of the scintillator in combination with the blue and green dyes a total of four materials: fast-blue, slow-blue, fast-green, and slow-green. A single large scintillator segment/structure may be formed using two light sensors on either side of the scintillator, one with a blue-transparent filter applied and the other with a green-transparent filter. In the fast and slow-emitting dyes option, the sensor package should also have good timing resolution of approximately 10 ns.

It will be appreciated that A PID MMSS, such as the system 10, is designed to detect neutrons even in the presence of gamma-ray backgrounds. For this invention, those neutrons may come from a nuclear smuggling threat source. Such a source may emit around 106 neutrons per second and produce neutron interaction rates in a small detector at a distance of 1 m away of order 100 Hz. In this scenario, separating the neutron signal with a PID MMSS, such as the system 10, allows for detection of the source even in the presence of a higher rate of ambient gamma backgrounds as well as identification of the source as a threat.

The PID MMSS system 10 is compatible with the operational requirements of portal monitors. It is able to detect a neutron signal with a brief exposure, can be deployed and operated without an expert, can be built to large sizes able to monitor shipping containers or vehicles, and is sufficiently robust to withstand the physical stresses of a commercial transport environment.

It will also be appreciated that to offer a significant benefit over these competing technologies, a PID MMSS should be able to offer the neutron-gamma discrimination unavailable in conventional scintillators. It should have sufficient selectivity to correctly reject medical isotopes and other high-gamma-rate non-threat sources as non-neutron-emitting sources. While a PID MMSS such as that described herein may not in all instances be able to achieve the extremely high levels of selectivity possible in PSD or 3He detectors, such high selectivity may not be needed to effectively separate realistic threat sources from non-threat sources.

One possible enhancement to the green/blue two-material design of the scintillator structure 10a described herein is to add another distinguishing property: slow versus fast emission time. By combining these two properties, the PID MMSS would have four total materials: fast-blue, slow-blue, fast-green, and slow-green. More materials adds more ability to distinguish between neutrons and gammas. The PID configuration can be adjusted so gammas typically hit all four materials while sometimes hitting three, and neutrons typically hit one while sometimes hitting two. This reduces the chance that an unusual interaction of one type is mistaken for the other type.

Manufacturability of a PID MMSS

One route to manufacturing PID MMSS is using stereo photolithography (SLA), especially the projection micro-stereolithography variety. With this technique, a liquid monomer solution containing one of the two dyes is cured into a solid polymer by light, thus producing one "color" of the "checkerboard" scintillator structure 10a as a free-standing solid structure. A second liquid containing the other dye is poured into this structure, filling the gaps with the second "color", to complete the manufacture of the scintillator structure 10a.

This approach allows for the sub-millimeter structures of the PID MMSS to be produced accurately. It also avoids the application of heat that might cause undesired behavior in the dyes. This approach necessitates minor changes to the ideal checkerboard structure of the scintillator structure 10a to allow fluid flow during the second phase.

As described herein, one of the two "colors" used in forming the scintillator structure 10a may be produced by the green-emitting dye 3-hydroxyflavone (SHF). This dye has the largest Stokes shift of any dye with a history of use in plastic scintillators. This large Stokes shift ensures that the 3-HF can emit green light while being entirely transparent to blue light. As part of the PID MMSS scintillator structure 10a emits blue light, this feature is absolutely required to permit detection of both colors of light. At the concentrations used in scintillators, it is not expected that 3HF or any other dye will impede the printing of scintillator using the SLA method.

PID MMSS for Neutron Multiplicity Counting in High-radioactivity Environments

Another embodiment of the PID MMSS system 10 described herein is fast neutron multiplicity counting. Consider the following scenario: Pu and 235U assay in fresh and spent fuel, using either active interrogation or passive monitoring. The scintillator structure 10a may be used as shown in FIG. 1. The cube size is similar, as either active interrogation or passive monitoring would be looking for neutrons from a spontaneous fission spectrum. The materials used to construct the scintillator structure 10a may be, for example, blue/green-dyed PVT, as discussed above. The fast/slow enhancement option is not possible in this case. PVT may be replaced with a radiation-damage-resistant matrix such as polysiloxane. For the sensor package, approximately four segments of scintillator, each with two light sensors, blue and green, as discussed above and shown in FIG. 1.

The above described PID MMSS has a unique benefit in applications such as fuel monitoring using neutron multiplicity, where the overall radiation rate is particularly intense. In these environments, the competing pulse-shape discrimination (PSD) technology is limited by pile-up. PSD-based neutron multiplicity detectors must adapt to pile-up by using lower-rate active interrogation (increasing measurement time), reducing detector size while increasing detector number (increasing cost), or sticking with fresh fuel instead of the more radioactive spent fuel. The PID MMSS described herein is much less affected by pile-up than PSD detectors, reducing the need for these compromises. This is because unlike PSD detectors, the PID MMSS system 10 described herein does not need to analyze longer pulse widths to discriminate between neutrons and gammas.

A PID MMSS can likely operate at a total event rate of roughly 108 events/second. Existing fast neutron multiplicity counters, such as the fast neutron coincidence collar (FNCL), are designed for interrogation rates of $5 \times 10^4$ neutrons/second and experience pile-up when the total event rate is around $4 \times 10^6$ events/second. Software and electronics tools designed to address the pile-up up problem in PSD detectors may ultimately allow for an event rate of around $2 \times 10^7$, but not plausibly significantly faster than that.

By handling an event rate of around 5x more than PSD, the PID MMSS system 10 offers the potential to:

Conduct active interrogation measurements faster;

Operate in environments containing multiple fuel elements creating a high ambient radiation rate;

Measure extremely radioactive spent fuel with less shielding and segmentation, resulting in a cheaper and more practical detector;

As the PID MMSS system 10 is estimated to have a lower neutron detection efficiency than PSD when run in a mode with very high gamma rejection, the PID MMSS system 10 will be easier to apply in active interrogation scenarios than in passive monitoring. In active interrogation scenarios induced fission raises the neutron/gamma ratio, so extremely high gamma rejection is less important.

The manufacture of the PID MMSS system 10 for high radioactivity environments may be similar to that described above, with modifications to prevent radiation damage in the scintillator. High Stokes-shift green dyes such as SHF are generally more tolerant of radiation damage than most other options, as the radiation damage can produce absorption in the blue wavelengths that are "skipped" by the Stokes shift. Radiation-damage-resistant blue-emitting plastic scintillators are a topic of active research. Many efforts to increase resistance to radiation damage alter the scintillating matrix, which in this design may be changed with small impact to the performance, instead of the dyes, which cannot be easily changed in this design. Polysiloxane in particular has an extensive history in both additive manufacture and radiation-resistant scintillator research.

PID PSD MMSS

Another application of the embodiments of the present disclosure may involve a target measurement of neutron rate and spectrum above a background. For example, a scenario may be the detection of SNM with especially large amounts of neutron shielding, at large distances, and/or in the presence of deliberately confounding gamma sources. The scintillator structure 10a may be as described above for FIG. 1. The unit size of the cubes 12a and 12b may be somewhat smaller, for example around 100 pm, to target the energy range where PSD is less effective. Specific materials for the scintillator structure 10a may be, for example, blue/green-dyed PSD organic glass scintillator. The scintillator structure 10a may include two light sensors (e.g., filtered blue/green sensors).

In this application, the neutron rate emitted from the threat source may be particularly low compared to the gamma rate at the system 10. If the neutron source is highly shielded or is far from the system 10, the neutron rate in the system 10 will be small compared to ambient gammas. An adversary could also attempt to mask a neutron source by adding a high-rate gamma-emitting medical isotope or other non-threat source, raising the gamma rate high above the neutron rate from the hidden SNM. In these situations, the possibility is that neither a PSD nor a PID MMSS, will be able to detect the neutrons above the gamma-induced background rate due to a small fraction (<1CT4) of gamma rays being misidentified as neutrons.

This system 10 solves this problem using a combination of both PSD and PID MMSS mechanisms. These two mechanisms operate independently, and so the gamma-rejecting powers of the two approaches are multiplied. Gamma rejection power may improve by a factor of 102 or more, depending on the photon loss associated with adding the blue-green filters required for PID compared to a PSD-only design. The neutron detection efficiency is also reduced due to the multiplication of the PSD and PID efficiencies, but by a factor of no more than 5. This reduction is smaller than the improvement in gamma rejection, but may in some specific instances still limit the system 10 to applications with relatively long measurement times to collect additional neutrons.

The system 10 is designed to push past the limits of conventional PSD: however good PSD organic glass scintillators can get, a PID MMSS such as the system 10 adds a margin of improvement on top of that. The margin of improvement is enough that even if another organic scintillator surpasses the PSD performance of organic glass, a hypothetical new scintillator would still not exceed the capabilities of a PID and PSD glass scintillator structure.

Gaseous detectors compete with this approach for the ultimate gamma rejection. The complete insensitivity of 3He tubes to gamma rays is significant, but the PID+PSD MMSS technique described above should cost significantly less. Other gaseous detectors suffer from much greater bulk for a given degree of neutron detection efficiency, as well as lower robustness and higher cost.

A PID+PSD MMSS system such as described herein, in one embodiment, may use green and blue organic glass scintillators. It will be appreciated that organic glass scintillators are an emerging technology, and additional work in this area is expected (particularly in the development of organic glasses) to even further improve the viability of this type of system. Organic glass scintillators can be formed similar to more familiar silicate glasses, which have a long history in additive manufacturing. The most likely avenue for manufacture of this design is fused filament fabrication, in which filaments of glass are liquefied to add material to the growing part. A mixing nozzle can mix different dyes into the base organic glass filament during the printing process.

Direct ink writing and electrophoretic deposition are two other additive manufacturing processes that may offer the potential to make PR gradients out of blue/green organic glass scintillators. A challenge with these two techniques is that they may require the piece to be brought up to about 200° C. after printing to glassify the organic compounds, at which point the dyes are already in the piece and may be degraded by that temperature. Fused filament fabrication, however, is expected to allow the glassification to occur when the filament is produced. The dye can then be loaded during printing at a lower temperature. If this temperature challenge can be addressed, for example using other organic glasses with lower glassification temperatures, these other techniques will offer alternative routes to manufacture.

Figure 2A:
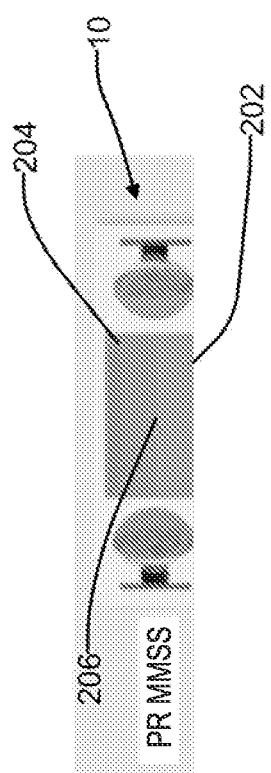
FIG. 2a shows another embodiment of a PR MMSS in which the scintillator structure is made of gradients of material which respond differently to received gamma and neutron radiation.

Another embodiment of an MMSS in accordance with the present disclosure is a position-resolving (PR) MMSS 200 shown in FIG. 2a. The PR MMSS 200 in this example forms a scintillating structure having a gradient of scintillating material to identify the location of radiation interactions. In this example the PR MMSS 200 includes a first scintillating material 202 (e.g., producing green light) at a bottom portion of the volume of the MMSS 200, and a second (different) scintillating 204 material (e.g., producing blue light) at the top of the volume, and in between a graded mixture 206 of these two materials. When radiation hits the MMSS 200, the resulting mixture of green and blue light would indicate the position of the interaction along the gradient. The PR MMSS 200 therefore can determine the location of an interaction along one axis. Such a design effectively "embeds" the position resolving capability of a multi-volume detector within a single AM-produced volume.

A PR MMSS could also be constructed in a manner which enables it to resolve an interaction position along a second axis. This may be achieved by varying a different property of the scintillating material other than light emission color. Because of the extremely fine control offered by AM, the PR MMSS could also vary the speed of light emission along an axis orthogonal to the color axis, producing a different light pulse shape depending on the location along this second axis.

Anisotropic PID MMSS for Incident Neutron Spectrometry

Figure 3:
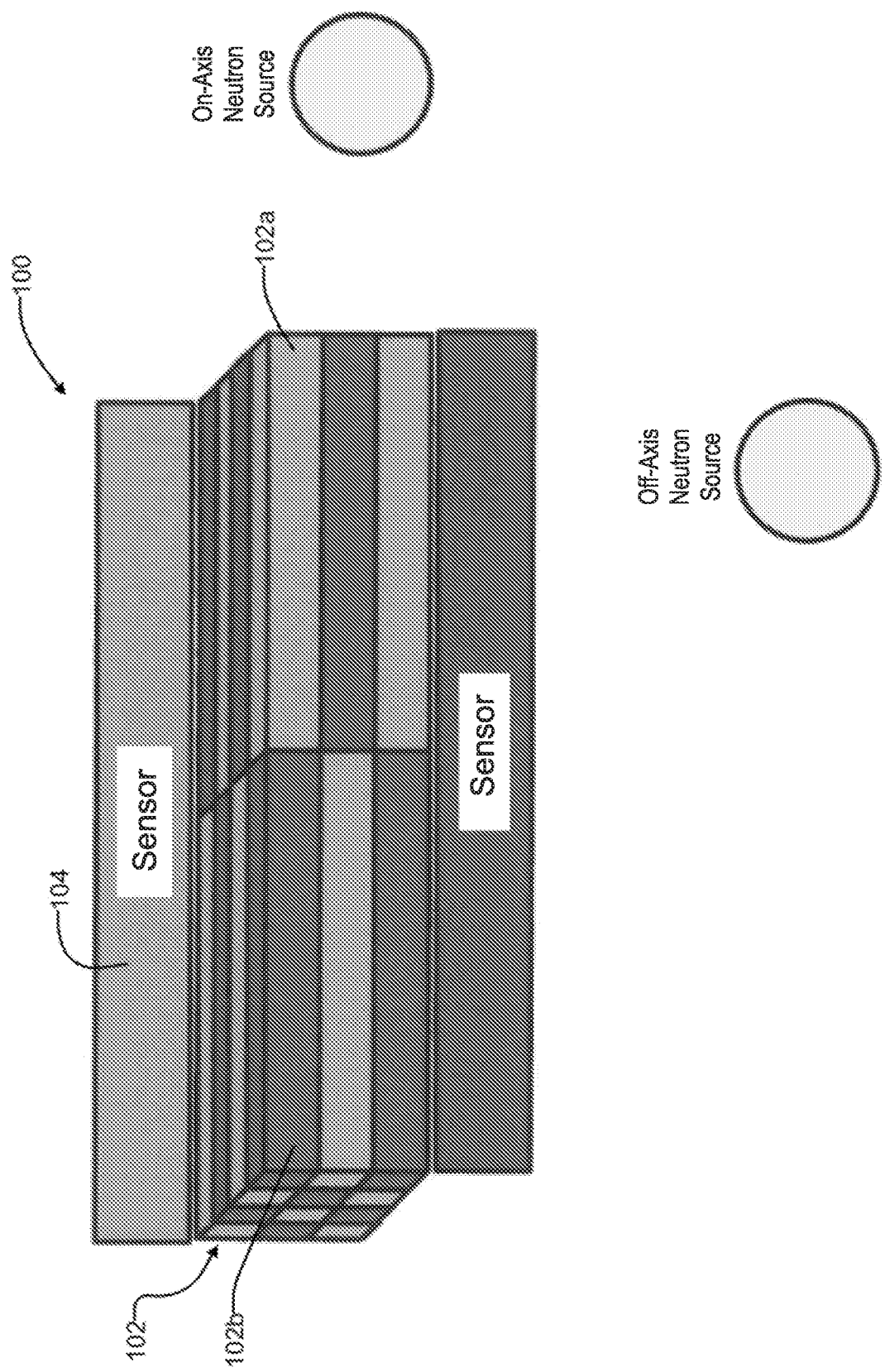
FIG. 3 shows another embodiment of the present disclosure in which the system forms an anisotropic particle-identifying MMSS (APID MMSS), which is able to form spectroscopy on neutrons coming from the on-axis neutron source location.

Referring to FIG. 3, an anisotropic PID MMSS ("APID MMSS") system 100 is shown for measuring an Incident neutron spectrum. The system 100 may be useful for a scenario involving measuring the ratio of fissile versus alpha-n neutron sources in SNM. The source must be at a fixed location and relatively compact. The system 100 in this embodiment makes use of a scintillator structure 102 involving a PID checkerboard made of long rectangular prisms 102a and 102b. Each prism 102a and 102b may vary in dimensions, but in one embodiment each prism 102a and 102b measures about 50 pm high×50 pm wide×500 pm in length. While FIG. 3 shows a 3×4×2 arrangement of prisms 102a and 102b, in practice hundreds or more such prisms may be employed in each axis of the scintillator structure 102.

Specific materials used to construct the prisms 102a and 102b may be blue/green PVT, as described above. A slow/fast pulse shape PVT may also be used in this configuration. A sensor package 104 may be included with two light sensors (or one, in the slow/fast materials option). This segment is oriented so the long axis of the PID scintillator structure 102 is aimed at the neutron source (the "on-axis" source in FIG. 2). A polyethylene collimator (not shown) may be desired to filter neutrons coming from directions other than the source.

The energy spectrum of neutrons emitted by an SNM item can be used to evaluate the presence of alpha-n emitted in the item and constrain assays of the fissile content, for example by identifying the presence of metal oxides. Determining the neutron spectrum is difficult using only the spectrum of proton recoils induced by the neutrons. The difficulties associated with this "unfolding" problem can be greatly reduced by capturing information about the direction of proton recoils.

The present APID MMSS system 100 is a variation of the PID MMSS concept that has a direction-sensitive response. By constructing the underlying APID "checkerboard" scintillator structure 102 with a preferred direction, the APID MMSS system 100 is more sensitive to proton recoils in that direction. By comparing the observed energy spectra of proton recoils in each APID segment of the scintillator structure 102, the detector 104 can reconstruct the mix of recoil angles contributing to each observed recoil energy, and from there calculate the incident neutron spectrum.

The APID MMSS system 100 approach offers a significant improvement over neutron spectrometry using only PSD scintillators. These scintillators are quite good at proton recoil spectroscopy, but are limited in the ability to reconstruct the incident neutron spectrum without ambiguity born from degeneracies in the unfolding calculation. This undermines attempts to confidently assay the neutron source.

APID neutron spectrometers also face limitations in efficiency. A given APID segment provides recoil angle information about only a subset of the neutrons that strike it: ones with an energy that matches the unit size of the APID and a recoil angle that matches the orientation of that segment. Combining multiple segments at different angles increases the rate of useful neutron recoils, lowering the measurement time to acquire a useful spectrum. This increase the cost and size of the APID detector, but the choice of additional segments can be optimized for sensitivity to the energy range most valuable for a particular application, mitigating this increase.

It is expected that the APID MMSS system 100 will have especially strong potential for cost and deployment benefits over competing technologies. The APID MMSS system 100 requires fewer and less advanced sensors, reducing cost and simplifying the deployment procedure. It also can be easily built to many different form factors, thus making it ideally suited for many different deployment environments. The APID MMSS system 100 in this example is entirely solid, avoiding the difficulties of deploying liquid- or gas-based detectors.

APID neutron spectrometers may face some limitations in efficiency. For example, a given APID segment provides recoil angle information about only a subset of the neutrons that strike it: ones with an energy that matches the unit size of the APID and a recoil angle that matches the orientation of that segment. Combining multiple segments at different angles increases the rate of useful neutron recoils, lowering the measurement time to acquire a useful spectrum. This will likely increase the cost and size of the APID detector, but the choice of additional segments can be optimized for sensitivity to the energy range most valuable for a particular application, mitigating this increase.

Anisotropic PID for Thread Source Search

Figure 4:
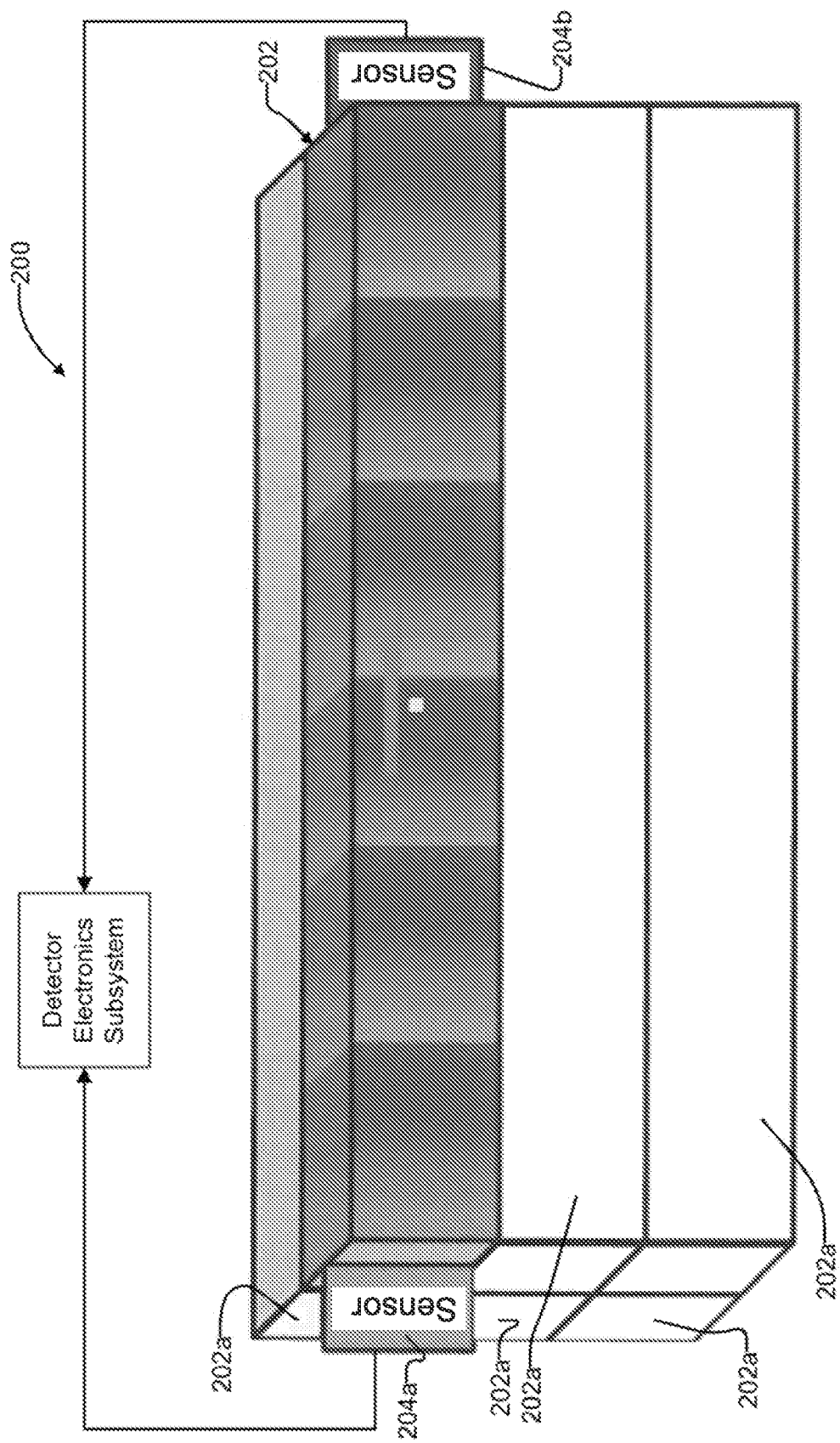
FIG. 4 shows another embodiment of a system in accordance with the present disclosure where the MMSS scintillator structure is adapted for use in a scatter camera application.

Another application of the present disclosure is in measuring neutron rate and energy in angle-selective segments. For example, consider the scenario involving pointing to the location of a fissile neutron source. An APID MMSS system 200 is shown in FIG. 4 which is well suited for this application. In this embodiment a scintillator structure 202 comprises a PID checkerboard made of long rectangular prism segments 202a, similar to that described above for the scintillator structure 102. Depending on the expected scenario, the prism segments 202a may be extended slightly in the vertical axis (e.g., 50 pm×500 pm×100 pm). While only a 2×3 array of prism segments 202a is shown in FIG. 4, in practice a 10×10 prism segment scintillator structure 202 is likely to be employed.

The materials used to construct the prism segments 202a may vary, but in one embodiment may be blue/green PVT, as discussed above. The scintillator structure 202 may be packaged with six or more prism segments 202a, each with two light sensors 204a and 204b. In one embodiment ten such prism segments 202a may be utilized. Each prism segment 202a is aligned in a different horizontal direction to maximize sensitivity to a hidden source in any horizontal direction, so that the hidden source is on-axis for one segment and off-axis for others (FIG. 3 illustrates the on-axis and off-axis source positions). Additional segments can be added and aligned at a vertical angle to increase sensitivity to sources below or above the plane of the scintillator structure 202.

Similar to how an APID can be used to determine the spectrum of a source at a known location, the APID MMSS system 200 can be used to determine the location of a source with a known (or approximately known) spectrum, such as a fissile source. In an APID MMSS 200 pointing at the source, high-energy proton recoils will be observed as single-color events, and the proton recoil track can remain within the long axis of an APID MMSS scintillator structure 202. In an APID MMSS system 200 positioned at a small angle away from the source, intermediate energy proton recoils will still be observed as single-color events, but high energy recoils will be observed as two-color events. As the APID's MMSS system's 200 angle to the source decreases, the maximum energy visible as single-color events decreases.

Using an array of several APID MMSS systems 200, the direction of the source relative to the systems can be determined by identifying the APID MMSS system 200 that observes the highest energy proton recoils. Further analysis can narrow down the location by comparing the energies observed in all segments of a given scintillator structure 202 against the expectation for a source at any position. This will allow for resolution of the source location finer than the number of APID MMSS system 200 segments.

The same technologies described above compete with the APID MMSS 200 for neutron source pointing applications. As in that case, every competing technology including APID has limitations on its efficiency. APID stands out among the competing technologies for its deployability and low cost. Both deployability and cost may be slightly more limited than in the case of neutron spectrometry APID, due to the number of segments required for neutron pointing, but not to such a degree that removes the advantage APID has over other technologies.

An interesting feature that enhances the deployability of neutron-pointing APID is that the scintillator structure system 200 segments need not be located within a single detector assembly. System 200 segments could be distributed around fixed points in a room, or each segment could be carried by a different member of a search team. In addition to being more convenient in some applications, these distributed deployments could speed up the process of locating the neutron source. For example, the APID system 200 segments could be augmented with software that would allow the members of a search team to coordinate their positions to enhance the ability of the APID to find the source, or APIDs mounted in a room could use motorized mounts to focus all APID system 200 segments on a region identified by one APID system 200 segment as containing a source.

One particularly useful application may be the monitoring of spent fuel casts. Neutron-point PIDs could be deployed in an array on the top of the cask which point to neutron sources inside, allowing for a quick count of the number of fuel elements in the cask. Because the rough location of the fuel elements is known (i.e., somewhere inside the cask), identifying their positions can be done more efficiently than in a situation where the source has a totally unknown position. An APID system 200 for neutron pointing can be manufactured the same way as an APID for neutron spectrometry, as described herein.

ID PR MMSS for Neutron/Gamma Scatter Cameras

In another embodiment, one or more of the embodiments described herein may be used for making a target measurement of neutron and gamma hit location, energy and time. For example, consider the scenario: Identifying the location and incident energy of both neutrons and gammas simultaneously, allowing for location and isotope identification of an unknown source. The scintillator structure may be a PR scintillator structure in a long pillar about 1 cm×1 cm×10 cm. The PR gradient is periodic, as shown in FIG. 4. The period is approximately 1 cm. The scintillator structure may comprise a gradient-dyed organic glass scintillator. The scintillator structure sensor package may be formed using, for example, 100 segments of scintillator structures, each with separate light sensors (e.g., blue and green light sensors) at each end. These light sensors should have approximately 1 ns timing resolution. These segments may be wrapped in optical reflector foil and bundled into a single volume.

Scatter cameras offer the ability to measure the direction and spectrum of incoming radiation simultaneously. Several different scatter camera designs are actively in development for national security applications. A key requirement of all scatter cameras is the ability to identify the location of radiation interactions. A PR MMSS, such as described herein, can augment the ability of scatter cameras to identify the location of interactions, increasing the precision of the derived direction and energy of the incoming radiation.

The pillars-of-plastic-scintillator (PiPS) scatter camera design uses a segmented volume of conventional (non-MMSS) plastic scintillator to detect incoming radiation. The location of radiation interactions is identified in two axes by observing which segment was hit, and in the third axis (lengthwise down the pillar) using a combination of the differences in timing and amplitude of the light seen by sensors on the two ends of the pillar. This design already has sufficient position identification abilities for some purposes, but can be augmented using a PR MMSS such as described herein.

The PR MMSS design shown in FIG. 4 takes advantage of the ability of a PiPS scatter camera to localize the interaction location to approximately 1 cm in the lengthwise axis. That identifies which of the periodic gradient "zones" the radiation hit, and then the precise position in that zone can be determined using the ratio of green and blue photons observed. This process "multiplies" the position resolving capabilities of the PiPS scatter camera. Thus, while good resolution can be achieved using the conventional PiPS capabilities alone, adding a PR MMSS as described herein is expected to significantly improve the resolution of such a combined system.

Using organic glass scintillators, the PR-MMSS-PiPS scatter camera can also employ pulse-shape discrimination (PSD) to separately identify gamma and neutron signals. This allows for independent measurements of the neutron and gamma spectra and for determining the location of a weak neutron source in the presence of high ambient gamma backgrounds.

This embodiment (PR-MMSS-PiPS) may thus be viewed as an augmentation of an existing technology rather than a replacement of a competing technology. The increased precision in the lengthwise access offered by PR MMSS improves the PiPS scatter camera in the factor most limiting its current performance. Adding PR MMSS capabilities to the PiPS design is expected to reduce the light yield somewhat, and so simulations may be helpful to demonstrate the improved position precision outweighs the increased uncertainty in interaction energy as the light yield decreases.

The organic glass additive manufacturing required for a scintillator structure for the PR-MMSS-PiPS embodiment of the present disclosure can be done with a number of techniques as described herein for other embodiments. Compared to the PID-PSD MMSS application discussed herein, the PR gradient required here requires less fine control over the manufactured structure and so should be easier. And unlike other embodiments described herein, the scatter camera pillars benefit from being able to sense both blue and green light at each end of the pillar, rather than collecting each color at a different end. Silicon photomultipliers with divided outputs and striped filters have been developed that provide this capability.

ID PR MMSS for DOI-TOF PET Scanners

Figure 5:
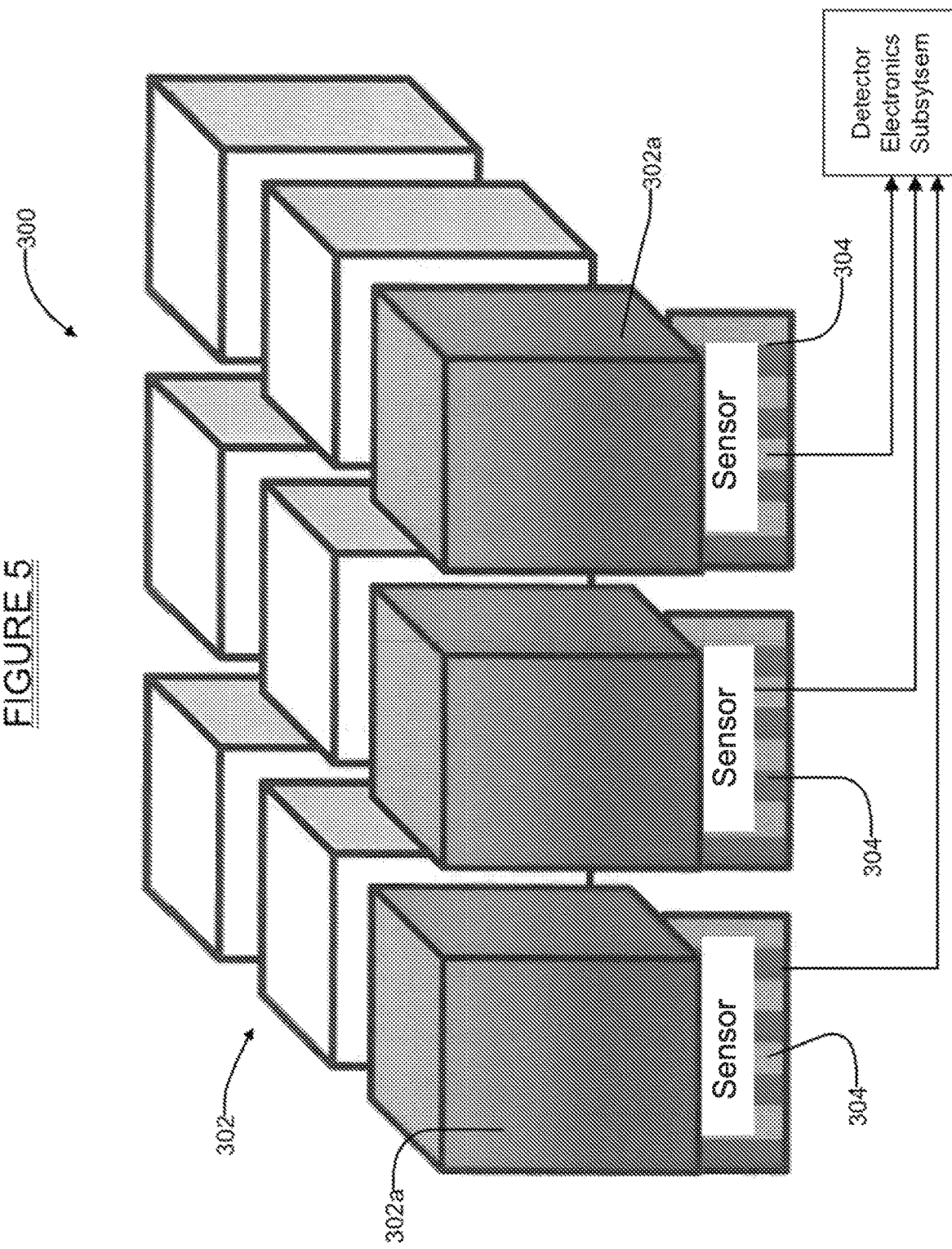
FIG. 5 shows another embodiment of a PR MMSS system of the present disclosure especially well adapted for a PET application, and which allows for depth of interaction sensing.

Referring to FIG. 5, another system 300 is shown which is well adapted for measuring a hit location, energy and time of a gamma ray. The scenario where the system 300 may have significant utility is precise PET radiography. A PR scintillator structure 302 may be formed using a plurality of plastic cubes 302a, with each cube being, for example, about 1 cm on a side. The PR gradient is linear in the depth axis of the cube 302a, as shown in FIG. 5. Each cube 302a may form a gradient-dyed organic scintillator, for example using either glass or plastic. In one embodiment the PR scintillator structure 302 may form a sensor package having, for example, 10,000 scintillator cube 302a segments. Each cube 302a may have a two-channel blue and green light sensor 304 at one end. The light sensors 304 should have fast timing resolution, for example preferably on the order of approximately 1 ns timing resolution. These cube 302a segments may be arranged in a barrel around the scanning target. The cubes 302a may be formed by gradient-dyed organic scintillator, for example either glass or plastic. The cubes 302a may each be about 1 cm on a side. The PR gradient is linear in the depth axis of the cube 302a, as shown in FIG. 5.

Presently there are many prototype PET scanners under development that leverage depth-of-interaction (DOI) sensing to increase the precision of reconstruction of the positron annihilation location. Simultaneously, different prototypes are being worked on that use the fast scintillation times of plastic scintillators to enable time-of-flight (TOE) reconstruction of the annihilation location. A PR MMSS, such as shown in FIG. 5, can combine these two approaches for an inexpensive yet highly precise PET scanner.

Using MMSS organic scintillators instead of the currently standard inorganic scintillators in a PET detector may result in a reduced detection efficiency due to the reduced photoelectric absorption cross section in organic scintillators and the challenges of using the higher Compton scatter cross section to compensate. Several schemes for improving the efficiency of organic scintillator PET detectors are under development by the PET community, including using a monolithic inorganic scintillator gamma-catching layer behind the organic position-resolving layer and analysis enhancements that allow for better use of the Compton-scattered gammas.

Many competing DOI PET designs can only resolve two positions (front/back) in the depth axis. The ability of the PR MMSS described herein to finely resolve depth will offer increased imaging precision compared to these detectors. While other DOI detectors can resolve position finely, some of these solutions require fast timing sensors at both ends of each pixel, which interferes with the ideal form factor for a PET scanner.

It will be appreciated that PET scanners do not require PSD capabilities as they do not detect neutrons. As a result, the scintillator structure 302 shown in FIG. 5 does not require organic glass. The scintillating matrix may be either glass or plastic depending on which provides faster timing capabilities using the dyes required for PR MMSS. If made from glass, the scintillator structure 302 can be manufactured the same way as described herein in connection with the 1D PR MMSS for neutron/gamma scatter cameras. If made from plastic, which might be less expensive, a direct-ink process is expected to be the most likely manufacturing avenue, as fused fiber fabrication may require temperatures incompatible with the dyes, and producing smooth dye gradients with SLA is challenging.

Single-ended, two-color readout for PET has already been developed, allowing for the important advantage of reading out the PR MMSS's two colors using a single sensor. Some additive manufacturing techniques may be viable for producing inorganic scintillators, which have some advantages for PET scanners. However, it is not yet known that the fine control of scintillation properties possible with organic scintillators can be achieved while additively manufacturing inorganic scintillators.

ID PR MMSS to Augment Fast Neutron Radiography Backplanes

Another application for the present disclosure is measuring neutron flux as a function of position in a plane. A system 400 is shown in FIG. 6 for accomplishing this. The scenario for this application is radiographic imaging of a target object, including imaging of the hydrogenous components of the object using neutron scattering. To accomplish this the system 400 makes use of a scintillator structure 402 which is rotated by a rotation subsystem 404, for example an electric motor, via a mechanical element 406 connected to the scintillator structure. The scintillator structure 402 includes a plurality of PR gradient scintillator rods 402a secured adjacent one another, where the entire scintillator structure 402 is rotated as a single subassembly. The scintillator rods 402a may vary in dimensions to meet the needs of a given application, but in one embodiment they may comprise rods having dimensions of approximately 5 cm wide×5 cm high×25 cm in length, with the PR gradient running lengthwise down each of the rods 402a. The rods 402a may be formed of a material such as gradient-dyed organic glass scintillator.

The scintillator structure 402 forms a sensor package in this embodiment with the five scintillator rods 402a arranged to form a single flat plane. Each scintillator rod 402a is preferably wrapped in reflector foil (not shown). Each scintillator rod 402a segment is instrumented with blue/green light sensors 408 at each end. These sensors 408, along with the rotation subsystem 404, may be in communication with a detector/controller electronics subsystem 410. The sensors 408 preferably have approximately 10 ns timing resolution. The scintillator structure 402 is mechanized via the rotation subsystem 404 so it can rotate in the azimuth (i.e., along the axis of the mechanical element 406).

In operation a neutron source 412 shines through an object 414 to be imaged and the transmitted neutrons strike the PR MMSS scintillator structure 402. The scintillator structure 402 finely resolves the position of the neutron interaction in the axis of the PR gradient of the scintillator rods 402a (i.e., along a vertical plane in FIG. 6), and coarsely between the five scintillator rod 402s segments. The array of scintillator rod 402a segments rotates in the plane to allow the fine resolution axis of the scintillator structure 402 to change, allowing for full 2D image reconstruction using tomographic techniques.

Fast neutron radiography allows for determination of the contents of an unknown target via the transparency of the target to neutrons. Similar to x-ray radiography, neutron radiography requires a detector located behind the target (relative to the neutron source), which is able to resolve which part of the detector was hit. This "backplane" detector is conventionally constructed out of scintillator pixels, each with its own light sensor. The cost and bulk of the many light sensors limits the number of pixels and thus the resolution of the radiographic image.

The design of the system 400 in FIG. 6 has fine position resolution along the lengthwise axis of the PR MMSS scintillator rods 402a and coarser resolution in the orthogonal axis (i.e., in the axis running between the scintillator rods in the scintillator structure 402). The fine resolution axis collects a high-resolution image of the target projected into a single dimension. By rotating the scintillator structure 402, and therefore the direction of the fine resolution axis, several different projections can be collected and combined into a two-dimensional image using tomographic techniques. The coarse resolution axis allows for breaking some degeneracies in the tomographic reconstruction, resulting in a better two-dimensional image using fewer rotations, and thus requires less scanning time. The long shape of the scintillator rods 402a also enhances light collection.

It will be appreciated then that the scintillator structure 402 of the system 400 may be made out of organic glass scintillator, enabling neutron/gamma discrimination using PSD. This allows the scintillator structure 402 to more clearly isolate the image produced by neutron scattering.

The system 400 design allows for a neutron radiographic detector with especially low cost compared to current pixelated technologies. The system 400 in this embodiment requires only ten light sensors 410 (two per scintillator rod 402a0) while a pixelated detector with similar resolution may require 250 or more sensors, resulting in a much higher cost. This design is also very robust due to the small number of components and so is suitable for field deployment.

It will also be appreciated that neutron radiography generally uses 14.1 or 2.5 MeV neutrons, higher than the average neutron emitted from spontaneous fission of SNM. As a result, the PR MMSS system 400 is particularly well suited for this application compared to passive detection of SNM because the higher energy neutrons produce more high-energy recoils that can be resolved to higher position precision. The scintillator structure 400 may also be constructed, as discussed herein, by additively manufacturing a gradient of dyes in organic glass scintillators using a number of well-developed techniques.

Figure 7:
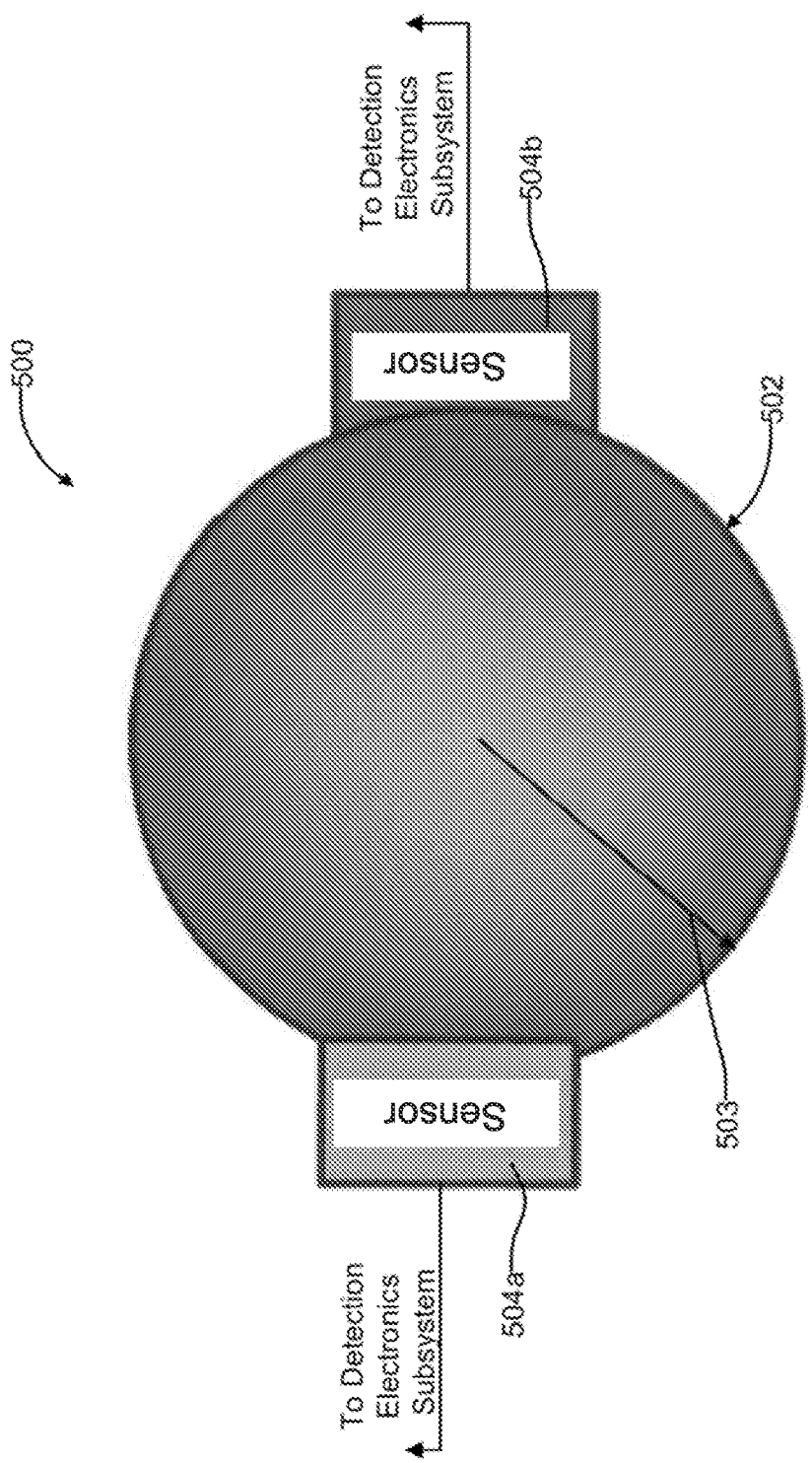
FIG. 7 shows another embodiment of the present disclosure which makes use of a Bonner Sphere to form a Neutron and Gamma Spectroscopy system which is able to identify a depth of capture of radiation interactions in the sphere.

Bonner Sphere—Style Neutron and Gamma Spectroscopy Using PR MMSS to Identify Depth-of-Capture Referring to FIG. 7 a system 500 is shown in accordance with another embodiment of the present disclosure. The target measurement that the system 500 is used to make is neutron and gamma spectra, and the scenario is simultaneous measurement of a neutron and gamma source with unknown composition using a handheld detector. The system 500 has a PR scintillator structure formed as a scintillator sphere 502. In this example the scintillator sphere 502 may be about 13 cm in diameter. The scintillator sphere 502 has PR gradient which runs radially (i.e., along arrow 503) indicating a depth inside the scintillator sphere. The scintillator sphere 502 may be made from gradient-dyed plastic scintillator or organic glass, doped with lithium-6. The system 500 forms a single assembly, in this example weighing about 10 kg, instrumented with two light sensors 504a and 504b, which form filtered blue and green light sensors.

The Bonner sphere neutron spectrometer is a long-serving mainstay of the keV-MeV neutron spectroscopy toolkit. Bonner spheres typically employ a range of differently-sized spheres of moderating plastic around cores of thermal neutron sensors. Each different size sphere has a different sensitivity to neutrons of various energies, as more energetic neutrons require a larger sphere to efficiently moderate and eventually capture. By observing the differential rate of thermal neutron absorption in the cores of the spheres, the incident neutron spectrum can be reconstructed.

The single scintillator sphere 502, which may be made of lithium-6-doped and forms a PR MMSS, is able to both identify neutron captures and measure how deep into the scintillator sphere those captures occurred. Depth of capture inside a single sphere is likely less well correlated with the incident neutron than the efficiency of moderation, and so this design is not expected to have quite the degree of energy resolution that a Bonner sphere array provides. At the same time, the scintillator sphere 502 can be constructed to be significantly more compact than a traditional Bonner sphere array, therefore allowing for handheld deployment.

The PR MMSS system 500 has advantages over competing neutron spectroscopy technologies similar to those described above for the system 100 of FIG. 3. The system 500 is compact, robust, and relatively low cost to construct. Compared to APID MMSS neutron spectroscopy, the PR depth-of-capture approach of the system 500 may have slightly lower energy resolution and more challenging calibration requirements to establish the relationship between the depth-of-capture distribution and the incident neutron energy spectrum. However, the depth-of-capture approach that the system 500 employs, unlike the APID approach, does not require pointing the detector at the neutron source, and therefore the system 500 can measure neutron sources with unknown positions, or even neutron sources located at multiple positions.

Another advantage of the system 500 is design over Bonner spheres is that it can simultaneously measure a gamma spectrum, since the sphere is made of scintillator material. Using the PR capabilities of the scintillator, this design may be able to improve the gamma spectroscopy over other plastic-scintillator-based detectors by using the depth axis to select for gamma rays more likely to have deposited their full energy in the scintillator. This benefit is compelling enough that the system 500 may even be valuable solely as a gamma spectrometer.

The scintillator sphere 502 device can be manufactured via the same techniques for glass or plastic as described herein. In this case, lithium-6 should be added to the glass or plastic as a neutron capture agent. Lithium-6 has been successfully added to plastic scintillator, and further research on doping organic glasses with lithium is underway.

Packed Fiber Neutrino Detection

Figure 8:
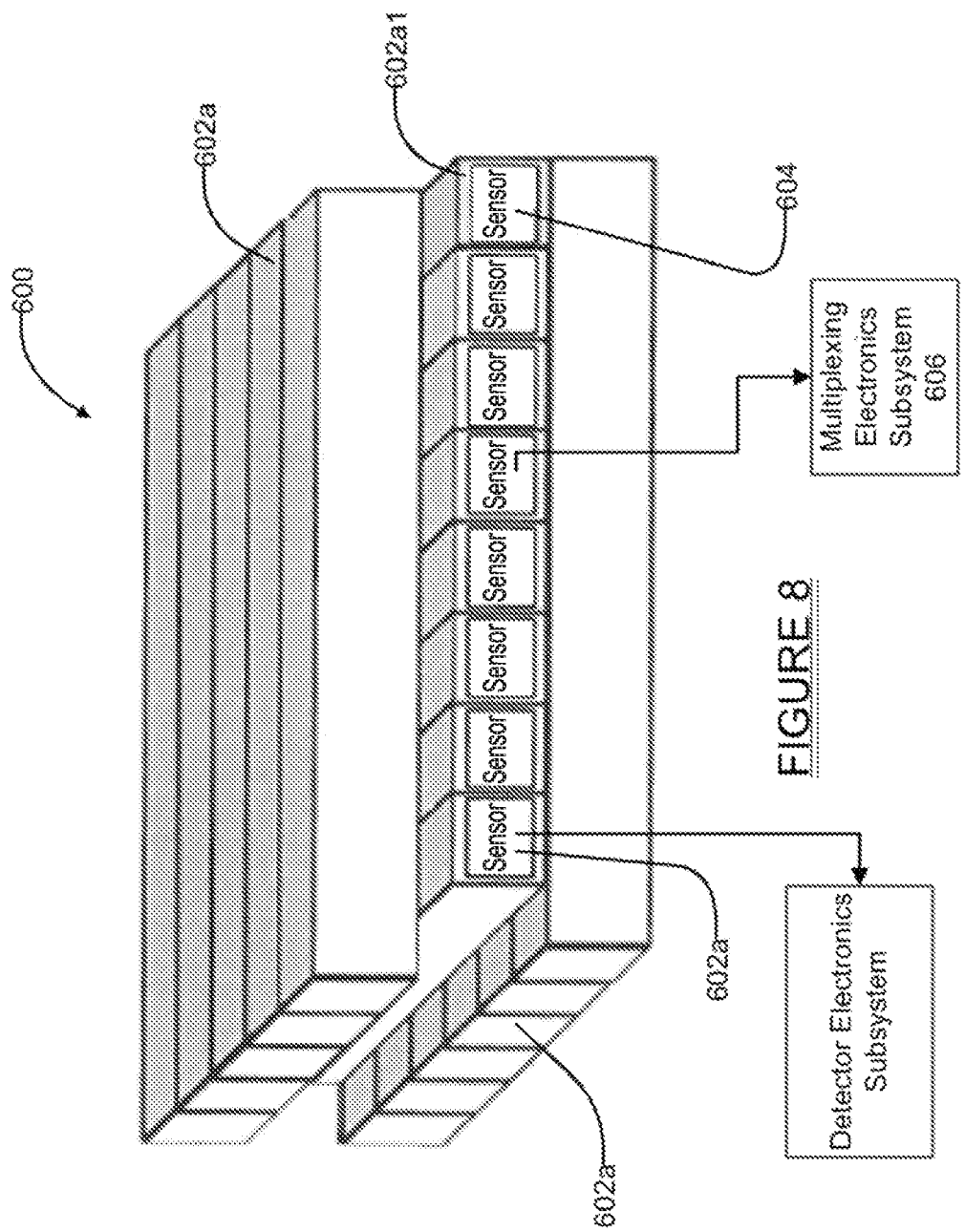
FIG. 8 shows another embodiment of the present invention which forms a packed fiber neutrino detector.

Referring to FIG. 8, a system 600 for measuring neutrino rate and spectrum is disclosed. The application scenario for the system 600 is near-field reactor monitoring using directional detection of neutrinos. In this embodiment the system 600 incorporates a scintillator structure 602 comprised of parallel arranged scintillating fibers 602a packed into a plurality of orthogonally arranged layers. For convenience only three layers are shown, but in practice a greater or lesser number of layers of scintillating fibers 602a may be incorporated, and each layer may have a greater or lesser number of fibers than that shown in FIG. 8 and may be configured to form a cube. In one implementation the scintillating structure 602 may comprise 1000 or more layers each having 1000 or more scintillating fibers 602a. Designated fibers in each layer, such as fiber 602a1, may be augmented with lithium-6 compound for neutron capture.

Each scintillating fiber 602a may have a cross section of about 1 mm and a length of 1 m, also these dimensions may vary to meet the needs of a specific application. Preferably, one of every 10 fibers 602a in a lengthwise row is wrapped with lithium-6, as indicated by sensor 602a1. The fibers 602a may be made from a scintillating plastic fiber, for example a lithium-6 compound (e.g., lithium fluoride). The scintillating structure 602 in this example forms a 1 m$^3$ sensor package. The four vertical faces of each fiber 602a are instrumented with light sensors 604 (only one surface of the middle row being shown in FIG. 8) with the ability to read out individual fibers, for example multi-anode PMTs or silicon photomultiplier arrays. Each of the light sensors 604 may be in communication with a multiplexing electronics subsystem 606 which enables reduction of the approximately 106 sensor channels in this example into a practical number<103 of digitization channels.

Figure 9:
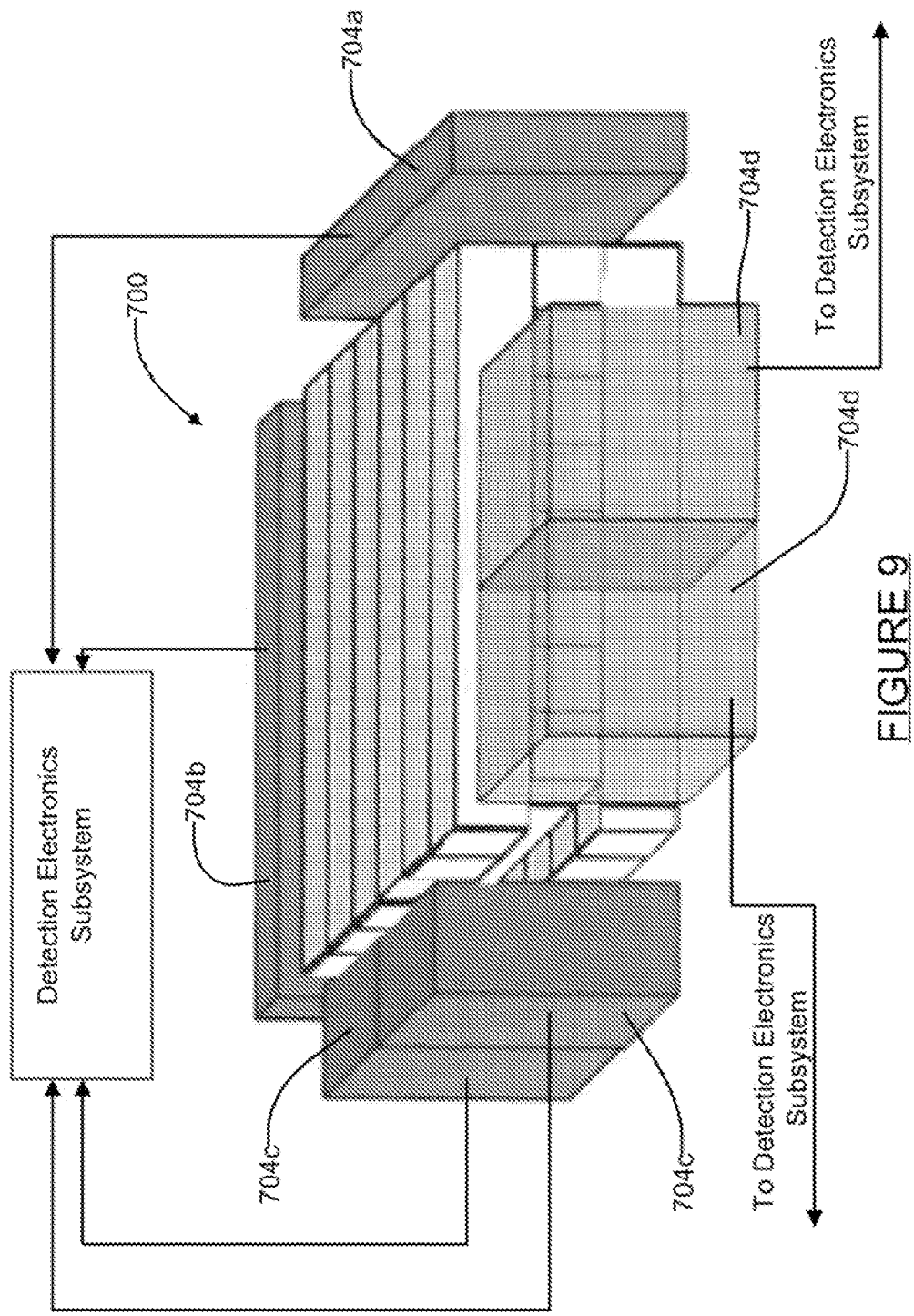
FIG. 9 shows another embodiment of the system shown in FIG. 8, but where the light sensors include both image-intensified CCDs and large, high-efficiency photomultiplier (PMTs) for light collection.

An alternative sensor arrangement incorporating image-intensified CCDs is shown in the scintillator structure 700 of FIG. 9. In this embodiment the parallel arranged scintillator fibers 702a form a plurality of layers which make up a scintillator cube. The image-intensified CCDs 704a and 704b can be used on two adjacent faces of the scintillator cube structure 702. The image-intensified CCDs 704a and 704b have the ability to identify light in individual fibers 702a due to fine pixilation (individual pixels of the image-intensified CCDs not being shown in the Figure) for position resolution. The other two faces of the scintillator cube structure 702 are instrumented with large high-efficiency PMTs 704c and 704d, with multiple fibers 702a coupled to each of the PMTs. The PMT 704c and 704d faces cannot resolve individual fibers 702a, but still offer higher proton detection efficiency, and can provide gate signals to the CCDs 704a and 704b, and do not require advanced multiplexing. Combined, the two sensor systems offer fast and reasonably efficient photon detection as well as individual fiber level position resolution.

The systems 600 and 700 are able to measure the anti-neutrino spectrum emitted from a nuclear reactor, and can thus be used to monitor the fuel mix of that reactor. Anti-neutrino detectors have been successful at using the inverse beta decay (IBD) mechanism to measure the neutrino spectrum from a nearby («10 m) nuclear reactor. These detectors should have the ability to: 1) recognize the prompt positron followed by coincident neutron capture signature of the IBD, and also 2) to reject backgrounds caused by a combination of neutrons and gamma rays originating from a cosmic ray interacting nearby the detector. These systems 600 and 700 additionally benefit from the ability to identify the relative locations of the prompt positron and neutron capture in order to reconstruct the direction of the neutrino source.

Present day detectors are efficient at requirement 1 above, but despite their impressive advances in meeting requirement 2, backgrounds remain a major limiting factor in the performance. A detector with increased ability to discriminate against backgrounds would increase the precision of the measurement of the reactor fuel mix and reduce the requirement for cumbersome shielding.

Fine position resolution of individual interactions is the avenue most likely to suppress backgrounds in the next generation of near-field IBD detectors. This technique can identify the multiple interactions of a Compton-scattering gamma ray, reducing backgrounds by a significant factor. Sufficiently fine position resolution can resolve the annihilation gamma rays emitted from the positron, further increasing the detector's selectivity for IBDs. The systems 600 and 700 detector designs shown in FIGS. 7 and 8 achieve the maximum benefit from fine position resolution by enabling tracking of individual charged particle interactions. Most antineutrino-induced positrons will travel for several millimeters, passing through multiple scintillator fibers 602a or 702a, which can be observed by imaging the light coming out of the fibers. This allows for excellent selection of positrons and greatly reduced backgrounds. These designs also include neutron capture tagging by identifying hits on the lithium-coated fibers. This enables near-held neutrino directional detection, allowing for discriminating between neutrinos from different nearby reactors.

The systems 600 and 700 represent are somewhat related to several existing detector concepts. For example, fiber and liquid-capillary-based tracking detectors have been demonstrated for neutron spectroscopy above 20 MeV, and this principle can be extended to positron tracks in the energy range of interest for anti-neutrino detection. The systems 600 and 700 show that readout of the position resolution is plausible using image-intensified CCDs. Models show that a detector with coarser resolution than described here can resolve the annihilation gammas to further suppress backgrounds. The systems 600 and 700 represent what is believed to be a system design which is the first to propose combining the packed-Hber structure with the neutrino detection application.

The systems 600 and 700 may represent the ultimate in near-held antineutrino detection. Compared to existing neutrino detectors, these systems have greater ability to separate antineutrinos from backgrounds, allowing for shorter measurement times to identify noncompliant reactor states and/or a smaller, more portable package. Energy resolution, which is important for measuring the reactor fuel mixture, may be slightly reduced by limitations in collecting light from the Hbers but likely improved by a greater amount using the advanced event reconstruction. However, these advantages come at a significant cost increase due to the more complicated sensor readout needed to image approximately 106 Hber channels. Fortunately, the cost of reading out millions rather than hundreds of segments will not scale linearly: several practical technologies exist to read out many positrons simultaneously at reasonable cost, including multiplexed multi-anode PMTs (MAPMTs) or SiPM arrays, or image-intensified CCDs which would not need multiplexing. These technologies impose a slightly increased cost, but not an unfeasible one.

The systems 600 and 700 also hit squarely into the MMSS concept despite differing significantly from the PR and PID categories. Packing Hber into a detector is an additive manufacturing process, even if it uses a different sort of additive manufacture than typical 3D printers. It also requires a mixture of material properties to guide light down the Hbers and to add the lithium-6 neutron capture agent to specific Hbers. Finally, an optimized version of this design may use a custom-printed variable-refractive-index scintillator to optimize the light collection to ensure that there is both a strongly position dependent signal, and that light that escaped the position-specific channel is still collected to improve energy resolution. This optimized design may resemble an extremely fine version of the Raghavan optical lattice, consisting of air-gapped scintillator cubes approximately 1 mm on a side. This kind of optimization is strongly synergistic with the additive manufacturing capabilities presently under development for various ones of the embodiments of the present disclosure.

The crossed-fiber scintillator structure described here is larger than that produced for other present day detectors, but there should not be an issue with scaling up various designs that have already been proven.

The addition of lithium to the scintillating fibers used for neutron capture readout should be straightforward, as this lithium can remain outside the fiber material as opposed to the greater challenge of dissolving a lithium compound inside the scintillator.

One significant task in constructing the systems 600 and 700 is with constructing a multiplexing scheme if MAPMTs or SiPM arrays are used. In this situation, there would be approximately 106 sensor channels, but digitizing this many channels is likely unfeasible for a nonproliferation detector, both for cost and deployability reasons. Instead, these channels should be multiplexed in a complex scheme that performs some of the track-localization in analog electronics or digital trigger modules before using a smaller number of digitization channels to read out only the approximately 10 to 100 relevant sensor channels in each event.

FIG. 3 shows a scintillating structure 100 in accordance with another embodiment of the present disclosure. The scintillating structure 100 in this example forms a PID MMSS. The two materials are arranged in alternating cubes 102a and 102b (similar to that described above for cubes 12 and 12b), in a fiber structures 104. Alternatively, the cubes 102a and 104 could be arranged in other shapes that optimize particle identification and optical transport. The structures in the PID MMSS 100 may repeat in a lattice arrangement so that the entire volume of the constructed scintillating structure 100 has the PID capability. This construction will align well with present day AM capabilities, as lattice structures are some of the most commonly manufactured structures using AM methods.

It will be appreciated that PID MMSSs fill a need left by the current state of the art of scintillation detectors. As in a pulse shape discriminating (PSD) detector, a PID MMSS can be used to identify special nuclear materials (SNM) by distinguishing between gamma and neutron radiation. In contrast, though, such an MMSS would not need expensive fast electronics because it does not need to discriminate between pulse shapes at the nanosecond scale. A PID MMSS can also be produced at a larger scale than pulse shape discrimination (PSD) materials because the AM process does not face the challenges of polymerizing a single large casted plastic. It is expected that the PID MMSS structure 100, when used as part of a detection system like that shown in FIG. 1, will also perform more reliably than PSD-based detectors for low energy radiation. This is because the difference between the two materials in an MMSS will be more apparent in lower-energy signals than the difference between pulse shapes in a PSD-based detector.

Position Resolving MMSS

Another embodiment of an MMSS in accordance with the present disclosure is a position-resolving (PR) MMSS 200 shown in FIG. 4. The PR MMSS 200 in this example forms a scintillating structure having a gradient of scintillating material to identify the location of radiation interactions. In this example the PR MMSS 200 includes red-scintillating material 202 at a bottom portion of the volume of the MMSS 200, a blue-scintillating 204 material at the top of the volume, and in between a graded mixture 206 of these two materials. When radiation hits the MMSS 200, the resulting mixture of red and blue light would indicate the position of the interaction along the gradient. The PR MMSS 200 therefore can determine the location of an interaction along one axis. Such a design effectively "embeds" the position resolving capability of a multi-volume detector within a single AM-produced volume.

A PR MMSS could also be constructed in a manner which enables it to resolve an interaction position along a second axis. This may be achieved by varying a different property of the scintillating material other than light emission color. Because of the extremely fine control offered by AM, the PR MMSS could also vary the speed of light emission along an axis orthogonal to the color axis, producing a different light pulse shape depending on the location along this second axis.

Another embodiment of the present disclosure involves contouring the gradients in a PR MMSS instead of aligning them along a linear axis. For example, in typical scintillation detectors the precision of the radiation energy measurement is reduced because the amount of light collection depends both on radiation energy and the location of the radiation interaction. With this understanding, a PR MMSS may be constructed to vary the scintillating material along a gradient that follows the light collection efficiency. This allows a detector receiving signals from the PR MMSS to determine if a given event was from a higher or lower collection region, and to correct for this effect. This design also improves the energy resolution of the detector by removing a confounding variable. This is particularly relevant for detectors with unusual form factors, such as one designed to fit around a spent fuel assembly, because unusual form factors can exacerbate the effect of position-dependent light collection.

It will also be appreciated the existing configuration of an optical lattice described hereinbefore can be used in connection with the PR MMSS embodiments discussed herein. This may involve using multiple materials to form the PR MMSS, that is conventional plastic and the air that fills the gaps between cubes of the scintillator structure. Advantageously, by using AM techniques, optical lattices can be constructed to significantly smaller scales, and more cost efficiently, than previously possible.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for detecting incoming radiation having a plurality of differing properties including at least one of first or second differing types, differing energies or differing incoming directions, the method comprising:
 using a scintillator structure formed from first and second dissimilar scintillator materials, the first and second dissimilar scintillator materials emitting first and second different colors of light in response to the first or second differing types, differing energies or differing incoming directions of the incoming radiation;
 using a first light detector responsive to only light generated from the first dissimilar scintillator material, to detect light having the first color;
 using a second light detector responsive to only light generated from the second dissimilar scintillator material, to detect light having the second color;
 generating a first output signal in response to detecting light having the first color, and generating a second output signal in response to detecting light having the second color; and
 analyzing the first and second output signals to determine at least one property of the incoming radiation.

2. The method of claim 1, wherein the scintillator structure includes a central area including a graded mixture of the first and second dissimilar scintillator materials, disposed between the first and second dissimilar scintillator materials; and
 generating a third output signal in response to incoming radiation when the incoming radiation impinges the central area, the third output signal including a mixture of light of the first and second colors; and
 wherein generation of the mixture of light of the first and second colors indicates impingement of the incoming radiation in the central area.

3. The method of claim 2, further comprising:
 providing a plurality of the scintillator structures, with each one of the plurality of scintillator structures having a cubic shape, wherein the plurality of scintillator structures are disposed in a grid-like arrangement and each has a height, width and depth dimension, and wherein the graded mixture of the first and second dissimilar scintillator materials forming the central area extends in the depth dimension of each one of the plurality of scintillator structures; and
 using a separate two-channel light sensor disposed adjacent a common side of each one of the plurality of scintillator structures to sense for at least one of the first light and the second light produced by the incoming radiation.

4. The method of claim 1, further comprising using a plurality of the scintillator structures and arranging the plurality of the scintillator structures adjacent one another along a longitudinal path, and wherein each said scintillator structure forms a prism segment, and the scintillator structures collectively form an elongated, linear scintillator assembly; and
 positioning the first and second light detectors at opposing longitudinal ends of the elongated, linear scintillator assembly; and
 using the first and second light detectors to detect the incoming radiation.

5. The method of claim 4, further comprising using a plurality of elongated, linear scintillator assemblies arranged adjacent and parallel to one another; and
 positioning separate additional pairs of first and second light detectors at opposing ends of each one of said plurality of elongated, linear scintillator assemblies; and
 using the pair of first and second light detectors, and the separate additional pairs of first and second light detectors, to detect the incoming radiation and to help determine a location of a source of the incoming radiation.

6. The method of claim 5, further comprising aligning at least two of said plurality of elongated, linear scintillator assemblies in different horizontal directions to increase sensitivity to the incoming radiation when the incoming radiation is travelling in different horizontal directions, to thus further help identify a source of the incoming radiation.

7. The method of claim 4, further comprising using pulse-shape discrimination to separately identify gamma and neutron signals present in the incoming radiation.

8. The method of claim 1, wherein a plurality of the scintillator structures are provided and shaped as elongated rods, disposed adjacent to one another to form a planar scintillating structure; and
 rotating the planar scintillating structure about an axis extending perpendicularly through the planar scintillator structure to measure a neutron flux associated with the incoming radiation; and
 wherein the neutron flux is a function of position in a plane formed by the planar scintillating structure.

9. The method of claim 1, wherein the determining at least one property of the incoming radiation comprises simultaneously measuring neutron and gamma spectra present in the incoming radiation.

10. The method of claim 9, wherein the scintillator structure is formed as a sphere, and the first material is present at an inner central area of the sphere, and the second material surrounds the first material; and
 wherein using a first light detector comprises using a first light detector arranged on one side of the sphere to detect the first color of light; and
 wherein using a second light detector comprises using a light detector arranged 180 degrees from the first light detector to detect the second color of light.

11. The method of claim 1, wherein:
 using a scintillator structure comprises using a plurality of the scintillator structures each formed as a fiber, and arranged adjacent to one another to form a plurality of planar layers, where adjacent planar layers are orientated perpendicularly to one another; and
 wherein the at least one property of the incoming radiation comprises determining a neutrino rate and spectrum associated with the incoming radiation.

12. The method of claim 11, wherein using a scintillator structure further comprises using a plurality of scintillator structures each formed as a fiber, and wherein at least a subplurality of the fibers is further wrapped with lithium-6 to act as a neutron capture agent.

13. The method of claim 12, further comprising using a multiplexing electronics subsystem to receive outputs from the first and second light detectors.

14. The method of claim 1, wherein a plurality of the scintillator structures are provided and arranged in layers adjacent to one another to form a scintillator cube, and wherein each said scintillator structure forms a scintillator fiber; and wherein using the first light detector comprises using a plurality of first light detectors arranged along adjacent first and second side surfaces of the scintillator cube to receive the first light, with each of the first light detectors forming a first image-intensified CCD; and wherein using the second light detector comprises using a plurality of second light detectors arranged along adjacent third and fourth side surfaces of the scintillator cube to receive the second light, with each of the second light detectors forming a second image-intensified CCD.

15. A method for detecting incoming radiation having a plurality of differing properties including at least one of first or second differing types, differing energies or differing incoming directions, the method comprising:

using a scintillator assembly formed from elongated scintillator structures, wherein each said elongated scintillator structure is formed from first and second dissimilar scintillator materials and is separated by an area forming a gradient mixture of the first and second materials, the first and second dissimilar scintillator materials emitting first and second different colors of light in response to the incoming radiation;

using a plurality of first light detectors for detecting only light having the first color;

using a plurality of second light detectors for detecting only light having the second color;

generating a first output signal in response to detecting light having the first color, and generating a second output signal in response to detecting light having the second color; and analyzing the first and second output signals to determine at least one property of the incoming radiation.

16. The method of claim 15, wherein using a scintillator assembly formed from elongated scintillator structures comprises using scintillator structures formed as fibers.

17. The method of claim 15, wherein using a scintillator assembly formed from elongated scintillator structures comprises using scintillator structures formed as elongated rods each having at least one of a square or rectangular cross-sectional shape.

18. The method of claim 15, wherein using a scintillator assembly formed form elongated scintillator structures comprises using a scintillator assembly formed from elongated scintillator structures which each include a plurality of regions of the first material, the second material, and the gradient mixture area.

19. A method for detecting incoming radiation having a plurality of differing properties including at least one of first or second differing types, differing energies or differing incoming directions, the method comprising:

using a scintillator structure formed as a sphere from a first scintillator material at a core area of the sphere, a second scintillator material surrounding the core area, and a gradient mixture area of the first and second scintillator materials disposed between the first scintillator and second scintillator materials, to receive the incoming radiation and to generate first and second different colors of light in response to the incoming radiation;

using a first light detector for detecting only light having the first color;

using a second light detector for detecting only light having the second color;

generating a first output signal in response to detecting light having the first color, and generating a second output signal in response to detecting light having the second color; and analyzing the first and second output signals to determine at least one property of the incoming radiation.

20. The method of claim 19, wherein analyzing the first and second output signals to determine at least one property of the incoming radiation includes using the first and second output signals to determine neutron and gamma spectra present in the incoming radiation; and wherein using the first and second light detectors further comprises using the first and second light detectors arranged 180 degrees from one another on opposing sides of the sphere.

* * * * *